US 6,662,322 B1

(12) United States Patent
Abdelilah et al.

(10) Patent No.: US 6,662,322 B1
(45) Date of Patent: Dec. 9, 2003

(54) SYSTEMS, METHODS, AND COMPUTER PROGRAM PRODUCTS FOR CONTROLLING THE ERROR RATE IN A COMMUNICATION DEVICE BY ADJUSTING THE DISTANCE BETWEEN SIGNAL CONSTELLATION POINTS

(75) Inventors: Youssef Abdelilah, Holly Springs, NC (US); Gordon Taylor Davis, Chapel Hill, NC (US); Ajay Dholakia, Gattikon (CH); Dongming Hwang, Cary, NC (US); Fredy D. Neeser, Langnau (CH); Malcolm Scott Ware, Raleigh, NC (US); Hua Ye, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/430,700

(22) Filed: Oct. 29, 1999

(51) Int. Cl.⁷ .......................... G06F 11/00; H04N 7/12; H04N 11/02; H04N 11/04
(52) U.S. Cl. ................... 714/708; 375/240.02
(58) Field of Search ................ 714/704, 799, 714/811, 708; 375/222, 240.02

(56) References Cited

U.S. PATENT DOCUMENTS

| 3,557,308 A | 1/1971 | Alexander et al. ......... 178/69.5 |
| 3,622,877 A | 11/1971 | MacDavid et al. ........ 324/73 R |
| 3,683,120 A | 8/1972 | Schenkel .................. 179/15 A |
| 3,729,717 A | 4/1973 | de Koe et al. ............ 340/172.5 |
| 4,112,427 A | 9/1978 | Hofer et al. ................ 340/347 |
| 4,132,242 A | 1/1979 | Carroll, Jr. .................. 137/263 |
| 4,208,630 A | 6/1980 | Martinez ....................... 375/7 |
| 4,237,552 A | 12/1980 | Aikoh et al. ................. 370/83 |
| 4,270,027 A | 5/1981 | Agrawal et al. .......... 179/81 R |
| 4,434,322 A | 2/1984 | Ferrell ..................... 178/22.13 |
| 4,450,556 A | 5/1984 | Boleda et al. ................. 370/58 |
| 4,577,310 A | 3/1986 | Korsky et al. ................ 370/58 |
| 4,578,796 A | 3/1986 | Charalambous et al. ....... 375/8 |
| 4,720,861 A | 1/1988 | Bertrand ...................... 381/36 |
| 4,731,816 A | 3/1988 | Hughes-Hartogs .......... 379/98 |

(List continued on next page.)

FOREIGN PATENT DOCUMENTS

| EP | 0 473 116 A2 | 8/1991 | ............ H04N/1/00 |
| EP | 0 659 007 A2 | 11/1994 | .......... H04M/11/06 |
| EP | 0 669 740 A2 | 12/1994 | .......... H04L/27/00 |
| FR | 2 345 019 | 3/1976 | .......... H04L/27/10 |
| WO | WO 96/18261 | 6/1996 | .......... H04M/11/00 |
| WO | WO 98/37657 | 8/1998 | |

OTHER PUBLICATIONS

Erup, et al., *Interpolation in Digital Modems—Part II: Implementation and Performance*, IEEE Transactions on Communications, vol. 41, No. 6, pp. 998–1008 (Jun. 1993).
Fischer, *Signal Mapping for PCM Modems*, V–pcm Rapporteur Meeting, Sunriver, Oregon, USA, 5 pp. (Sep. 4–12, 1997).

(List continued on next page.)

Primary Examiner—Christine T. Tu
Assistant Examiner—Joseph D. Torres
(74) Attorney, Agent, or Firm—Scott W. Reid; Myers, Bigel, Sibley & Sajovec, P.A.

(57) ABSTRACT

Error rate control systems, methods, and computer program products request a data rate slow-down based on the status of the error rate. A linear penalty is generated if a data rate slow-down is requested, which is then used to determine a minimum distance between constellation points in a signaling constellation or alphabet. Because the minimum distance between constellation points may be directly related to the error probability, the error rate may be controlled through the linear penalty.

30 Claims, 10 Drawing Sheets

U.S. PATENT DOCUMENTS

| | | | | |
|---|---|---|---|---|
| 4,756,007 A | | 7/1988 | Qureshi et al. | 375/37 |
| 4,760,598 A | | 7/1988 | Ferrell | 380/44 |
| 4,797,898 A | | 1/1989 | Martinez | 375/7 |
| 4,805,215 A | * | 2/1989 | Miller | 379/406.08 |
| 4,833,706 A | | 5/1989 | Hughes-Hartogs | 379/98 |
| 4,868,863 A | | 9/1989 | Hartley et al. | 379/98 |
| 4,884,285 A | | 11/1989 | Heynen et al. | 375/25 |
| 4,890,303 A | | 12/1989 | Bader | 375/107 |
| 4,890,316 A | | 12/1989 | Walsh et al. | 379/98 |
| 4,894,847 A | | 1/1990 | Tjahjadi et al. | 375/121 |
| 4,901,333 A | | 2/1990 | Hodgkiss | 375/98 |
| 4,943,980 A | | 7/1990 | Dobson et al. | 375/42 |
| 4,953,210 A | | 8/1990 | McGlynn et al. | 380/48 |
| 4,967,413 A | | 10/1990 | Otani | 371/37.4 |
| 4,972,360 A | | 11/1990 | Cuckier et al. | 364/724.04 |
| 4,985,902 A | | 1/1991 | Gurcan | 375/14 |
| 4,991,169 A | | 2/1991 | Davis et al. | 370/77 |
| 4,995,030 A | | 2/1991 | Helf | 370/32.1 |
| 5,005,144 A | | 4/1991 | Nakajima et al. | 364/565 |
| 5,007,047 A | | 4/1991 | Sridhar et al. | 370/32.1 |
| 5,014,299 A | | 5/1991 | Klupt et al. | 379/98 |
| 5,033,062 A | | 7/1991 | Morrow et al. | 375/7 |
| 5,038,365 A | | 8/1991 | Belloc et al. | 375/8 |
| 5,040,190 A | | 8/1991 | Smith et al. | 375/4 |
| 5,052,000 A | | 9/1991 | Wang et al. | 371/43 |
| 5,058,134 A | | 10/1991 | Chevillat et al. | 375/39 |
| 5,065,410 A | | 11/1991 | Yoshida et al. | 375/98 |
| 5,067,125 A | | 11/1991 | Tsuchida | 370/79 |
| 5,068,875 A | | 11/1991 | Quintin | 375/78 |
| 5,107,520 A | | 4/1992 | Karam et al. | 375/60 |
| 5,111,481 A | | 5/1992 | Chen et al. | 375/14 |
| 5,119,401 A | | 6/1992 | Tsujimoto | 375/14 |
| 5,119,403 A | | 6/1992 | Krishnan | 375/39 |
| 5,134,611 A | | 7/1992 | Steinka et al. | 370/79 |
| 5,142,552 A | | 8/1992 | Tzeng et al. | 375/14 |
| 5,157,690 A | | 10/1992 | Buttle | 375/14 |
| 5,187,732 A | | 2/1993 | Suzuki | 379/5 |
| 5,210,755 A | | 5/1993 | Nagler et al. | 370/108 |
| 5,222,077 A | * | 6/1993 | Krishnan | 375/261 |
| 5,225,997 A | | 7/1993 | Lederer et al. | 364/550 |
| 5,253,272 A | | 10/1993 | Jaeger et al. | 375/60 |
| 5,253,291 A | | 10/1993 | Naseer et al. | 379/406 |
| 5,263,033 A | * | 11/1993 | Seshadri | 714/792 |
| 5,265,151 A | | 11/1993 | Goldstein | 379/97 |
| 5,285,474 A | | 2/1994 | Chow et al. | 375/13 |
| 5,291,479 A | | 3/1994 | Vaziri et al. | 370/58.2 |
| 5,311,578 A | | 5/1994 | Bremer et al. | 379/97 |
| 5,317,594 A | | 5/1994 | Goldstein | 375/8 |
| 5,351,134 A | | 9/1994 | Yaguchi et al. | 358/435 |
| 5,353,280 A | | 10/1994 | Ungerböck | 370/32.1 |
| 5,386,438 A | | 1/1995 | England | 375/121 |
| 5,394,110 A | | 2/1995 | Mizoguchi | 329/304 |
| 5,394,437 A | | 2/1995 | Ayanoglu et al. | 375/222 |
| 5,398,303 A | | 3/1995 | Tanaka | 395/51 |
| 5,402,445 A | | 3/1995 | Matsuura | 375/229 |
| 5,406,583 A | | 4/1995 | Dagdeviren | 375/5 |
| 5,418,842 A | | 5/1995 | Cooper | 379/98 |
| 5,432,794 A | | 7/1995 | Yaguchi | 371/5.5 |
| 5,434,884 A | | 7/1995 | Rushing et al. | 375/235 |
| 5,471,508 A | * | 11/1995 | Koslov | 375/344 |
| 5,475,711 A | | 12/1995 | Betts et al. | 375/240 |
| 5,491,720 A | | 2/1996 | Davis et al. | 375/222 |
| 5,513,216 A | | 4/1996 | Gadot et al. | 375/233 |
| 5,519,703 A | | 5/1996 | Chauffour et al. | 370/84 |
| 5,528,625 A | | 6/1996 | Ayanoglu et al. | 375/222 |
| 5,528,679 A | | 6/1996 | Taarud | 379/34 |
| 5,533,048 A | | 7/1996 | Dolan | 375/222 |
| 5,534,913 A | | 7/1996 | Majeti et al. | 348/7 |
| 5,541,955 A | * | 7/1996 | Jacobsmeyer | 375/222 |
| 5,546,395 A | | 8/1996 | Sharma et al. | 370/84 |
| 5,563,908 A | | 10/1996 | Kaku et al. | 375/222 |
| 5,566,211 A | | 10/1996 | Choi | 375/332 |
| 5,598,401 A | | 1/1997 | Blackwell et al. | 379/94 |
| 5,625,643 A | | 4/1997 | Kaku et al. | 375/222 |
| 5,634,022 A | | 5/1997 | Crouse et al. | 395/704 |
| 5,640,387 A | | 6/1997 | Takahashi et al. | 370/359 |
| 5,646,958 A | | 7/1997 | Tsujimoto | 375/233 |
| 5,671,250 A | | 9/1997 | Bremer et al. | 375/222 |
| 5,694,420 A | | 12/1997 | Ohki et al. | 375/222 |
| 5,710,792 A | | 1/1998 | Fukawa et al. | 375/229 |
| 5,724,393 A | | 3/1998 | Dagdeviren | 375/296 |
| 5,726,765 A | | 3/1998 | Yoshida et al. | 358/412 |
| 5,729,226 A | | 3/1998 | Betts et al. | 341/94 |
| 5,732,104 A | | 3/1998 | Brown et al. | 375/222 |
| 5,734,663 A | | 3/1998 | Eggenberger | 371/39.1 |
| 5,742,643 A | * | 4/1998 | Reeves et al. | 375/243 |
| 5,751,717 A | | 5/1998 | Babu et al. | 370/466 |
| 5,751,796 A | | 5/1998 | Scott et al. | 379/93.31 |
| 5,754,594 A | | 5/1998 | Betts et al. | 375/285 |
| 5,757,849 A | | 5/1998 | Gelblum et al. | 375/222 |
| 5,757,865 A | | 5/1998 | Kaku et al. | 375/344 |
| 5,761,247 A | | 6/1998 | Betts et al. | 375/316 |
| 5,768,311 A | | 6/1998 | Betts et al. | 375/222 |
| 5,778,024 A | | 7/1998 | McDonough | 375/216 |
| 5,784,377 A | | 7/1998 | Baydar et al. | 370/463 |
| 5,784,405 A | | 7/1998 | Betts et al. | 375/222 |
| 5,784,415 A | | 7/1998 | Chevillat et al. | 375/341 |
| 5,793,809 A | | 8/1998 | Holmquist | 375/242 |
| 5,796,808 A | | 8/1998 | Scott et al. | 379/93.31 |
| 5,801,695 A | | 9/1998 | Townshend | 375/340 |
| 5,805,669 A | | 9/1998 | Bingel et al. | 379/28 |
| 5,809,075 A | | 9/1998 | Townshend | 375/254 |
| 5,812,537 A | | 9/1998 | Betts et al. | 370/286 |
| 5,815,534 A | | 9/1998 | Glass | 375/326 |
| 5,822,371 A | | 10/1998 | Goldstein et al. | 375/242 |
| 5,825,816 A | | 10/1998 | Cole et al. | 375/222 |
| 5,825,823 A | | 10/1998 | Goldstein et al. | 375/286 |
| 5,831,561 A | | 11/1998 | Cai et al. | 341/106 |
| 5,835,532 A | | 11/1998 | Strolle et al. | 375/233 |
| 5,835,538 A | | 11/1998 | Townshend | 375/295 |
| 5,838,724 A | | 11/1998 | Cole et al. | 375/222 |
| 5,839,053 A | | 11/1998 | Bosch et al. | 455/13.1 |
| 5,844,940 A | | 12/1998 | Goodson et al. | 375/222 |
| 5,850,388 A | | 12/1998 | Anderson et al. | 370/252 |
| 5,850,421 A | | 12/1998 | Misra et al. | 375/354 |
| 5,852,631 A | | 12/1998 | Scott | 375/222 |
| 5,862,141 A | | 1/1999 | Trotter | 370/468 |
| 5,862,179 A | | 1/1999 | Goldstein et al. | 375/242 |
| 5,862,184 A | | 1/1999 | Goldstein et al. | 375/295 |
| 5,870,429 A | | 2/1999 | Moran, III et al. | 375/222 |
| 5,872,817 A | | 2/1999 | Wei | 375/341 |
| 5,881,066 A | | 3/1999 | Lepitre | 371/20.5 |
| 5,881,102 A | | 3/1999 | Samson | 375/222 |
| 5,887,027 A | | 3/1999 | Cohen et al. | 375/222 |
| 5,911,115 A | | 6/1999 | Nair et al. | 455/63 |
| 5,914,982 A | | 6/1999 | Bjarnason et al. | 375/222 |
| 5,918,204 A | | 6/1999 | Tsurumaru | 704/214 |
| 5,926,506 A | | 7/1999 | Berthold et al. | 375/222 |
| 5,953,376 A | * | 9/1999 | Wei | 375/265 |
| 6,005,893 A | * | 12/1999 | Hyll | 375/260 |
| 6,178,200 B1 | * | 1/2001 | Okunev et al. | 375/222 |
| 6,185,249 B1 | * | 2/2001 | Drucker et al. | 375/222 |
| 6,298,092 B1 | * | 10/2001 | Heath et al. | 375/267 |

OTHER PUBLICATIONS

Gardner, *Interpolation in Digital Modems—Part I: Fundamentals, IEEE Transactions on Communications*, vol. 41, No. 3, pp. 501–507 (Mar. 1993).

Humblet et al., *The Information Driveway, IEEE Communications Magazine*, pp. 64–68 (Dec. 1996).

Kalet et al., *The Capacity of PCM Voiceband Channels,* IEEE International Conference on Communications '93, pp. 507–511 (Geneva, Switzerland, May 23–26, 1993).

Mueller et al., *Timing Recovery in Digital Synchronous Data Receiver,* IEEE Transactions on Communications, vol. Com–24, No. 5, pp. 516–531 (May 1976).

Okubo et al., *Building Block Design of Large Capacity PCM–TDMA Subscriber System and Direct Digital Interface to Digital Exchange,* Japan Radio Co., Ltd., pp. 69–73 (Japan).

Pahlavan et al., *Nonlinear Quantization and the Design of Coded and Uncoded Signal Constellations,* IEEE Transactions on Communications, vol. 39, No. 8, pp. 1207–1215 (Aug. 1991).

Proakis, *Digital Signaling Over a Channel with Intersymbol Interference, Digital Communications,* pp. 373, 381 (McGraw–Hill Book Company, 1983).

Williams et al., *Counteracting the Quantisation Noise from PCM Codecs,* BT Laboratories, pp. 24–29 (UK).

*A Digital Modem and Analogue Modem Pair for Use on the Public Switched Telephone Network (PSTN) at Data Signalling Rates of Up to 56 000 Bit/s Downstream and 33 600 Bit/s Upstream,* ITU–T V.90 (Sep. 1998).

*Series V: Data Communication Over the Telephone Network; Interfaces and voiceband modems; A modem operating at data signalling rates of up to 33 600 bit/s for use on the general switched telephone network and on leased point–to–point 2–wire telephone type circuits,* ITU–T V.34 (10/96).

Bell, R.A., et al., *Automatic Speed Reduction and Switched Network Back–up,* IBM Technical Disclosure Bulletin, vol. 32, No. 1, pp. 154–157 (Jun. 1989).

Abbiate, J.C., et al., *Variable–Data Transmission Modem,* IBM Technical Disclosure Bulletin, vol. 17, No. 11, pp. 3301–3302 (Apr. 1975).

*Data Communication Over the Telephone Network; Procedures for Starting Sessions of Data Transmission Over the General Switched Telephone Network,* ITU–T V.8 (09/94).

*Line Quality Monitoring Method,* IBM Technical Disclosure Bulletin, vol. 18, No. 8, pp. 2726–2726 (Jan. 1976).

*Loopback Tests for V.54 Data Communication Equipment,* IBM Technical Disclosure Bulletin, vol. 32, No. 3A, pp. 295–299 (Aug. 1989).

*On–Line Real Time Modem Testing,* IBM Technical Disclosure Bulletin, vol. 20, No. 6, pp. 2252–2254 (Nov. 1977).

Pierobon, Gianfranco L., *Codes of Zero Spectral Density at Zero Frequency,* IEEE Transactions on Information Theory, vol. IT–30, No. 2, pp. 435–439 (Mar., 1984).

Marcus, Brian H, et al., *On Codes with Spectral Nulls at Rational Submultiples of the Symbol Frequency,* IEEE Transactions on Information Theory, vol. IT–33, No. 4, pp. 557–568 (Jul. 1987).

Fischer, Robert, et al., *Signal Mapping for PCM Modems,* ITU–Telecommunications Standardization Sector PCM '97–120, V.pcm Rapporteur Meeting, (Sunriver, Oregon; Sep. 4–12, 1997).

*Pulse Code Modulation (PCM) of Voice Frequencies,* ITU–T, Recommendation G.711 (Geneva, 1972).

*Series G: Digital Transmission Systems; Terminal equipments—Coding of analogue signals by pulse code modulation; Pulse code modulation (PCM) of voice frequencies,* ITU–T, Recommendation G.711 (Geneva, 1996).

*Data Communication Over the Telephone Network; Error–Correcting Procedures for DCEs Using Asynchronous–to–Synchronous Conversion,* ITU–T V.42 (03/93).

*Improvement to Spectral Shaping Technique,* Research Disclosure, V. 41, n415,415111, pp. 1550–1551 (Nov. 1998).

*TIA Standard Draft: North American Telephone Network Transmission Model for Evaluating Analog Client to Digitally Connected Server Modems,* Telecommunications Industry Association, PN3857,Draft 10 (Feb. 1999).

Davis, Gordon T., *DSP and MATLAB implementation of model–based constellation generation* (Sep. 18, 1998).

Woodruff, K.R., et al, *Automatic and Adaptive System and Efficient Communication in Noisy Communication Line Environments,* IBM Technical Disclosure Bulletin, vol. 24, No. 9, pp. 4627–4629 (Feb. 1982).

Godard, D., et al., *Decision Feedback Equalizer Stabilization in Adaptive Mode,* IBM Technical Disclosure Bulletin, vol. 24, No. 11A, pp. 5691–5692 (Apr. 1982).

Borgnis–Desbordes, P., et al., *Variable–Speed Data Transmission,* IBM Technical Disclosure Bulletin, vol. 27, No. 4A, pp. 2269–2270 (Sep. 1984).

Couland, G., et al., *Analog Wrap Self–Test in Modems During Retrain Operations,* IBM Technical Disclosure Bulletin, vol. 28, No. 6, p. 2457 (Nov. 1985).

Maddens, F., *Sixteen–State Forward Convolutional Encoder,* IBM Technical Disclosure Bulletin, vol. 28, No. 6, pp. 2466–2468 (Nov. 1985).

*Remote Modem–Type Self–Learning,* IBM Technical Disclosure Bulletin, vol. 28, No. 6, pp. 2398–2399 (Nov. 1985).

Maddens, F., *Sixteen–State Feedback Convolutional Encoder,* IBM Technical Disclosure Bulletin, vol. 28, No. 10, pp. 4212–4213 (Mar. 1986).

Nobakht, R.A., *Trellis–Coded Modulation Coding Scheme for a 19/2 Kbps Modem,* IBM Technical Disclosure Bulletin, vol. 36, No. 11, pp. 167–170 (Nov. 1993).

Nobakht, R.A., *Unified Table Based Subset Decoder for the Viterbi Algorithm,* IBM Technical Disclosure Bulletin, vol. 37, No. 09, pp. 581–587 (Sep. 1994).

Nobakht, R.A., *Trellis Subset Decoder Algorithm Based on a Pattern Recognition Scheme,* IBM Technical Disclosure Bulletin, vol. 37, No. 10, pp. 693–697 (Oct. 1994).

Abbiate, J.C., et al, *Variable–Data Transmission Modem,* IBM Technical Disclosure Bulletin, vol. 17, No. 11, pp. 3301–3302 (Apr. 1975).

Barlet, J., et al., *Full Speed Recovery in High Speed Modems,* IBM Technical Disclosure Bulletin, vol. 23, No. 2, pp. 641–643 (Jul. 1980).

Dialog Abstract, *Sample rate converter for duplex modem,* European Patent No. 285413.

Dialog Abstract, *Two–speed full–duplex modem for telephone network,* PCT No. WO 8501407.

Dialog Abstract, *Digital data transmission system,* European Patent No. 124674.

Dialog Abstract, *Facsimile communication controller,* Japanese Publication No. 04–175060 (Jun. 23, 1992).

Dialog Abstract, *Picture communication equipment,* Japanese Publication No. 03–120954 (May 23, 1991).

Dialog Abstract, *Radio date transmission system,* Japanese Publication No. 01–179535 (Jul. 17, 1989).

Dialog Abstract, *Facsimile device,* Japanese Publication No. 57–164654 (Oct. 9, 1982).

Dialog Abstract, *Data repeater,* Japanese Publication No. 57–087255 (May 31, 1982).

Dialog Abstract, *Blinding training method for decision feedback equaliser having feed–forward and feedback filters*, European Patent No. 880253.

Dialog Abstract, *Processing method for distorted signal received by qam receiver*, European Patent No. 465851.

Dialog Abstract, *Establishing wireless communication channel*, PCT No. WO 9905820.

Dialog Abstract, *High–speed rate adaptive subscriber line digital data modem*, PCT No. WO 9830001.

Dialog Abstract, *Digital modem in digital modulation system*, Japanese Patent No. 8116341.

Dialog Abstract, *Communication equipment and radio communication adapter*, Japanese Publication No. 08–340289 (Dec. 24, 1996).

Dialog Abstract, *Data recording method*, Japanese Publication No. 05–089597 (Apr. 9, 1993).

Dialog Abstract, *Transmission control system for data communication and its modem equipment*, Japanese Publication No. 02–228853 (Sep. 11, 1990).

Naguib, A.F., et al., Dialog Abstract, *A space–time coding modem for high–data–rate wireless communications*, IEEE Journal of Selected Areas in Communications, vol. 16, No. 8, pp. 1459–1478 (Oct. 1998).

Denno, S., et al., Dialog Abstract, *Mbit/s burst modem with an adaptive equalizer for TDMA mobile radio communications*, IEICE Transactions on Commuincations, vol. E81–B, No. 7, pp. 1453–1461 (Jul. 1998).

Naguib, A.F., et al., Dialog Abstract, *A space–time coding modem for high–data–rate wireless communications*, GLOBECOM 97, IEEE Global Telecommunications Conference, vol. 1, pp. 102–109 (1997).

Kobayashi, K., et al., Dialog Abstract, *Fully digital burst modem for satellite multimedia communication systems*, IEICE Transactions on Communications, vol. E80–B, No. 1, pp. 8–15 (Jan. 1997).

Skellern, D.J., et al., Dialog Abstract, *A high speed wireless LAN*, IEEE Micro, vol 17, No. 1, pp. 40–47 (Jan.–Feb. 1997).

Enomoto, K., et al., Dialog Abstract, *A mode switching type burst demodulator AFC*, Transactions of the Institute of Electronics, Information and Communication Engineers, vol. J76B–II, No. 5, pp. 415–421 (May 1993).

Betts, W., Dialog Abstract, *Nonlinear encoding by surface projection*, International Conference on Data Transmission—Advances in Modem and ISDN Technology and Applications (Sep. 23–25, 1992).

Schilling, D.L., et al., Dialog Abstract, *The FAVR meteor burst communication experiment*, Military Communications in a Changing World MILCOM '91 (Nov. 4–7, 1991).

Jacobsmeyer, J.M., Dialog Abstract, *Adaptive trellis–coded modulation for bandlimited meteor burst channels*, IEEE Journal on Selected Areas in Communications, vol. 10, No. 3, pp. 550–561 (Apr. 1992).

Sato, T., et al., Dialog Abstract, *Protocol configuration and verification of an adaptive error control scheme over analog cellular networks*, IEEE Transactions on Vehicular Technology, vol. 41, No. 1, pp. 69–76 (Feb. 1992).

Lee, L.–N., et al., Dialog Abstract, *Digital signal processor–based programmable BPSK/QPSK/offset–QPSK modems*, COMSAT Technical Review, pp. 195–234 (Fall 1989).

Sato, T., et al., Dialog Abstract, *Error–free high–speed data modem*, Oki Technical Review, vol. 56, No. 133, pp. 20–26 (Apr. 1989).

Seo, J.–S, et al., Dialog Abstract, *Performance of convolutional coded SQAM in hardlimited satellite channels*, IEEE International Conference on Communications BOSTON-ICC/89, vol. 2, pp. 787–791 (Jun. 11–14, 1989).

Murakama, K., et al., Dialog Abstract, *FEC combined burst–modem for business satellite communications use*, IEEE/IECE Global Telecommunications Conference 1987, vol. 1, pp. 274–280 (Japan, Nov. 15–18, 1987).

McVerry, F., Dialog Abstract, *Performance of a fast carrier recovery scheme for burst–format DQPSK transmission over satellite channels*, International Conference on Digital Processing of Signals in Communications, pp. 165–172 (United Kingdom, 1985).

Filter, J.H.J., Dialog Abstract, *An algorithm for detecting loss of synchronisation in data transmission test sets (modems)*, Transactions of the South African Institute of Electrical Engineers, vol. 76, No. 1, pp. 39–43 (Jan. 1985).

Gersho, A., Dialog Abstract, *Reduced complexity implementation of passband adaptive equlizers*, IEEE Journal on Selected Areas in Communications, vol. SAC–2, No. 5, pp. 778–779 (Sep. 1984).

Dialog Abstract, *High–speed full–duplex modem reduces telephone connect time*, EDN, vol. 27, No. 18, p. 77 (Sep. 15, 1982).

Chadwick, H., et al., Dialog Abstract, *Performance of a TDMA burst modem through a dual nonlinear satellite channel*, Fifth International Conference on Digital Satellite Communications, pp. 63–67 (Italy, Mar. 23–26, 1981).

Nussbaumer, H., Dialog Abstract, *Reducing the acquisition time in an automatic equalizer*, IBM Technical Disclosure Bulletin, vol. 18, No. 5, pp. 1465–1479 (Oct. 1975).

Uzunoglu, V., et al., Dialog Abstract, *Synchronous and the coherent phase–locked synchronous oscillators: new techniques in synchronization and tracking*, IEEE Transactions on Circuits and Systems, vol. 36, No. 7, pp. 997–1004 (Jul. 1989).

Minei, I., et al., Dialog Abstract, *High–speed Internet access through unidirectional geostationary satellite channels*, IEEE Journal on Selected Areas in Communications, vol. 17, No. 2, pp. 345–359 (Feb. 1999).

Ovadia, S., Dialog Abstract, *The effect of interleaver depth and QAM channel frequency offset on the performance of multichannel AM–VSB/256–QAM video lightwave transmission systems*, International Conference on Telecommunications: Bridging East and West Through Communications, vol. 1, pp. 339–343 (Greece, Jun. 21–25, 1998).

Johnson, R.W., et al., Dialog Abstract, *Error correction coding for serial–tone HG transmission*, Seventh International Conference on HF Radio Systems and Techniques, pp. 80–84 (United Kingdom, Jul. 7–10, 1997).

Karasawa, Y., et al., Dialog Abstract, *Cycle slip in clock recovery on frequency–selective fading channels*, IEEE Transactions on Communications, vol. 45, No. 3, pp. 376–383 (Mar. 1997).

Umehira, M., et al., Dialog Abstract, *Design and performance of burst carrier recovery using a phase compensated filter*, Transactions of the Institute of Electronics, Information and Communication Engineers, vol. J78B–II, No. 12, pp. 735–746 (Dec. 1995).

De Bot, P., et al., Dialog Abstract, *An example of a multi-–resolution digital terrestrial TV modem*, Proceedings of ICC '93—IEEE International Conference on Communications, vol. 3, pp. 1785–1790 (Switzerland, May 23–26, 1993).

Lei, Chen, et al., Dialog Abstract, *Single–tone HF high speed data modem,* Proceedings of TENCON '93—IEEE Region 10 International Conference on Computers, Communications and Automation, vol. 3, pp. 94–98 (China, Oct. 19–21, 1993).

Woerner, B.D., et al., Dialog Abstract, *Simulation issues for future wireless modems,* IEEE Communications, vol. 32, No. 7, pp. 42–53 (Jul. 1994).

Sato, T., et al., Dialog Abstract, *Vehicle terminal equipment with dedicated DSP,* Oki Technical Review, vol. 58, No. 144, pp. 49–52 (Jul. 1992).

Tamm, Yu.A., Dialog Abstract, *The effect of suppressing harmonic interference using an adaptive equalizer,* Elektrosvyaz, vol. 45, No. 3, pp. 5–10 (Mar. 1990).

Saleh, A.A.M., et al., Dialog Abstract, *An experimental TDMA indoor radio communications system using slow frequency hopping and coding,* IEEE Transactions on Communications, vol. 39, No. 1, pp. 152–162 (Jan., 1991).

Nergis, A., Dialog Abstract, *Optimum HF digital communication systems with block coding and interleaving techniques,* Proceedings of the 1990 Bilkent International Conference on New Trends in Communication, Control and Signal Processing, vol. 1, pp. 511–517 (Turkey, Jul. 2–5, 1990).

Kawamata, F., et al., Dialog Abstract, *An evaluation of voice codecs and facsimiles,* Review of the Communications Research Laboratory, vol. 36, pp. 69–73 (Mar. 1990).

Sato, T., et al., Dialog Abstract, *Error–free high–speed data transmission protocol simultaneously applicable to both wire and mobile radio channels,* 38$^{th}$ IEEE Vehicular Technology Conference: 'Telecommunications Freedom—Technology on the Move', pp. 489–496 (Jun. 15–17, 1988).

Dialog Abstract, *1200–bit/s cellular modem DLD03H,* Oki Technical Review, vol. 53, No. 127, pp. 70–72 (Jul. 1987).

Chamberlin, J.W., et al., Dialog Abstract, *Design and field test of a 256–QAM DIV modem,* IEEE Journal on Selected Areas in Communications, vol. SAC–5, No. 3, pp. 349–356 (Apr. 1987).

De Cristofaro, R., et al., Dialog Abstract, *A 120 Bv/s QPSK modem designed for the INTELSAT TDMA network,* International Journal of Satellite Communications, vol. 3, Nos. 1–2, pp. 145–160 (Jan.Jun., 1985).

Shumate, A., Dialog Abstract, *Error correction coding for channels subject to occasional losses of bit count integrity,* IEEE Military Communications Conference, vol. 1, pp. 89–83 (Oct. 21–24, 1984).

Suyderhoud, H., et al., Dialog Abstract, *Investigation of 9.6 kb/s data transmission via a PCM link at 64 kb/s with and without link errors,* International Journal of Satellite Communications, vol. 2, No. 1, pp. 81–87 (Jan.–Mar., 1984).

Smith, C., Dialog Abstract, *Relating the performance of speech processors to the bit error rate,* Speech Technology, vol. 2, No. 1, pp. 41–53 (Sep.–Oct. 1983).

Suyderhoud, H., et al., Dialog Abstract, *Investigation of 9.6–kbit/s data transmission via a PCM link at 64 kbit/s with and without link errors,* Sixth International Conference on Digital Satellite Communications Proceedings, pp. 26–33 (Sep. 19, 23, 1983).

Kittel, L., Dialog Abstract, *Analogue and discrete channel models for signal transmission in mobile radio,* Frequenz, vol. 36, Nos. 4–5, pp. 153–160 (Apr.–May 1982).

Farrell, P.G., et al., Dialog Abstract, *Soft–decision error control of h.f. data transmission,* IEE Proceedings F (Communications, Radar and Signal Processing), vol. 127, No. 5, pp. 389–400 (Oct. 1980).

Johnson, A.L., Dialog Abstract, *Simulation and implementation of a modulation system for overcoming ionospheric scintillation fading,* AGARD Conference Proceedings No. 173 on Radio Systems and the Ionosphere, pp. 3/1–5 (Greece, May 26–30, 1975).

Matsumura, K., et al., Dialog Abstract, *Anti–interference data–transmission set of HF radio equipment,* Mitsubishi Electric Engineer, No. 41, pp. 18–23 (Sep., 1974).

Blank, H.A., et al., Dialog Abstract, *A Markov error channel model,* 1973 National Telecommunications Conference, vol. 1, pp. 15B/1–8 (Nov. 26–28, 1973).

McGruther, W.G., Dialog Abstract, *Long term error performance data for operation at 2400 bps on a nonswitched private line network,* Summaries of papers presented at 1970 Canadian symposium on communications, pp. 65–66 (Canada, Nov. 12–13, 1970).

Burton, H.O., et al., Dialog Abstract, *On the use of error statistics from data transmission on telephone facilities to estimate performance of forward–error–correction,* 1970 international conference on communications, p. 21 (Jun. 8–10, 1970).

Bowen, R.R., Dialog Abstract, *Application on burst error correction codes to data modems for dispersive channels,* Proceedings of the 1970 international symposium on information theory, p. 1 (Netherlands, Jun. 15–19, 1970).

Pierce, A.W., et al., Dialog Abstract, *Effective application of forward–acting error–control coding to multichannel h.f. data modems,* IEEE Transactions on Communication Technology, vol. Com–18, No. 4, pp. 281–294 (Aug. 1970).

West, R.L., Abstract, *Data Concentration Method,* IBM Technical Disclosure Bulletin, pp. 487–489; http://w3.infogate.ibm.com:1207/SESS506884/GETDOC/39/2/1 (Jul., 1975).

Haas, L.C., et al., Abstract, *Prepared Line Signal Quality Analysis,* IBM Technical Disclosure Bulletin, pp. 5414–5416; http://w3.infogate.ibm.com:1207/SESS506884/GETDOC/43/1/1 (May, 1981).

Nussbaumer, H., Abstract, *Reducing the Acquisition Time in an Automatic Equalizer,* IBM Technical Disclosure Bulletin, pp. 1465–1479; http://w3.infogate.ibm.com:1207/SESS506884/GETDOC/40/2/1 (Oct. 1975).

Dialog Abstract, *Listener echo canceller for digital communication system,* PCT No. WO 9310607.

Dialog Abstract, *Reduced time remote access method for modem computer,* PCT No. WO 9209165.

\* cited by examiner

SYSTEMS, METHODS, AND COMPUTER PROGRAM PRODUCTS FOR CONTROLLING THE ERROR RATE IN A COMMUNICATION DEVICE BY ADJUSTING THE DISTANCE BETWEEN SIGNAL CONSTELLATION POINTS

FIELD OF THE INVENTION

The present invention relates generally to the field of communication, and, more particularly, to controlling the error rate in a communication device.

BACKGROUND OF THE INVENTION

The demand for remote access to information sources and data retrieval, as evidenced by the success of services such as the World Wide Web, is a driving force for high-speed network access technologies. The public switched telephone network (PSTN) offers standard voice services over a 4 kHz bandwidth. Traditional analog modem standards generally assume that both ends of a modem communication session have an analog connection to the PSTN. Because data signals are typically converted from digital to analog when transmitted towards the PSTN and then from analog to digital when received from the PSTN, data rates may be limited to 33.6 kbps as defined in the V.34 Transmission Recommendation developed by the International Telecommunications Union (ITU).

The need for an analog modem may be eliminated, however, by using the basic rate interface (BRI) of the Integrated Services Digital Network (ISDN). A BRI offers end-to-end digital connectivity at an aggregate data rate of 160 kbps, which is comprised of two 64 kbps B channels, a 16 kbps D channel, and a separate maintenance channel. ISDN offers comfortable data rates for Internet access, telecommuting, remote education services, and some forms of video conferencing. ISDN deployment, however, has generally been very slow due to the substantial investment required of network providers for new equipment. Because ISDN is not very pervasive in the PSTN, the network providers have typically tariffed ISDN services at relatively high rates, which may be ultimately passed on to the ISDN subscribers. In addition to the high service costs, subscribers must generally purchase or lease network termination equipment to access the ISDN.

While most subscribers do not enjoy end-to-end digital connectivity through the PSTN, the PSTN is nevertheless mostly digital. Typically, the only analog portion of the PSTN is the phone line or local loop that connects a subscriber or client modem (e.g., an individual subscriber in a home, office, or hotel) to the telephone company's central office (CO). Local telephone companies have been replacing portions of their original analog networks with digital switching equipment. Nevertheless, the connection between the home and the CO has been the slowest to change to digital as discussed in the foregoing with respect to ISDN BRI service. A recent data transmission recommendation issued by the ITU, known as V.90, takes advantage of the digital conversions that have been made in the PSTN. By viewing the PSTN as a digital network, V.90 technology can accelerate data downstream from the Internet or other information source to a subscriber's computer at data rates of up to 56 kbps, even when the subscriber is connected to the PSTN via an analog local loop.

To understand how the V.90 Recommendation achieves this higher data rate, it may be helpful to briefly review the operation of V.34 analog modems. V.34 modems are generally optimized for a configuration in which both ends of a communication session are connected to the PSTN by analog lines. Even though most of the PSTN is digital, V.34 modems treat the network as if it were entirely analog. Moreover, the V.34 Recommendation assumes that both ends of the communication session suffer impairment due to quantization noise introduced by analog-to-digital converters. That is, the analog signals transmitted from the V.34 modems are sampled at 8000 times per second by a codec upon reaching the PSTN with each sample being represented or quantized by an eight-bit pulse code modulation (PCM) codeword. The codec uses 256, non-uniformly spaced, PCM quantization levels defined according to either the $\mu$-law or A-law companding standard (i.e., the ITU G.711 Recommendation).

Because the analog waveforms are continuous and the binary PCM codewords are discrete, the digits that are sent across the PSTN can only approximate the original analog waveform. The difference between the original analog waveform and the reconstructed quantized waveform is called quantization noise, which limits the modem data rate.

While quantization noise may limit a V.34 communication session to 33.6 kbps, it nevertheless affects only analog-to-digital conversions. The V.90 standard relies on the lack of analog-to-digital conversions in the downstream path, outside of the conversion made at the subscriber's modem, to enable transmission at 56 kbps.

The general environment for which the V.90 standard has been developed is depicted in FIG. 1. An Internet Service Provider (ISP) 22 is connected to a subscriber's computer 24 via a V.90 digital server modem 26, through the PSTN 28 via digital trunks (e.g., T1, E1, or ISDN Primary Rate Interface (PRI) connections), through a central office switch 32, and finally through an analog loop to the client's modem 34. The central office switch 32 is drawn outside of the PSTN 28 to better illustrate the connection of the subscriber's computer 24 and modem 34 into the PSTN 28. It should be understood that the central office 32 is, in fact, a part of the PSTN 28. The operation of a communication session between the subscriber 24 and an ISP 22 is best described with reference to the more detailed block diagram of FIG. 2.

Transmission from the server modem 26 to the client modem 34 will be described first. The information to be transmitted is first encoded using only the 256 PCM codewords used by the digital switching and transmission equipment in the PSTN 28. These PCM codewords are transmitted towards the PSTN 28 by the PCM transmitter 36 where they are received by a network codec. The PCM data is then transmitted through the PSTN 28 until reaching the central office 32 to which the client modem 34 is connected. Before transmitting the PCM data to the client modem 34, the data is converted from its current form as either $\mu$-law or A-law companded PCM codewords to pulse amplitude modulated (PAM) voltages by the codec expander (digital-to-analog (D/A) converter) 38. These PAM voltage levels are processed by a central office hybrid 42 where the unidirectional signal received from the codec expander 38 is transmitted towards the client modem 34 as part of a bidirectional signal. A second hybrid 44 at the subscriber's analog telephone connection converts the bidirectional signal back into a pair of unidirectional signals. Finally, the analog signal from the hybrid 44 is converted into digital PAM samples by an analog-to-digital (A/D) converter 46, which are received and decoded by the PAM receiver 48. Note that for transmission to succeed effectively at 56 kbps, there must be only a single digital-to-analog conversion and subsequent analog-todigital conversion between the server modem 26 and the client modem 34. Recall that analog-to-digital conversions in the PSTN 28 may introduce quantization noise, which may limit the data rate as discussed hereinbefore. The A/D converter 46 at the client modem 34, however, may have a higher resolution than the A/D converters used in the analog portion of the PSTN 28 (e.g., 16 bits versus 8 bits), which results in less quantization noise. Moreover, the PAM receiver 48 needs to be in synchronization with the 8 kHz network clock to properly decode the digital PAM samples.

Transmission from the client modem 34 to the server modem 26 follows the V.34 data transmission standard. That is, the client modem 34 includes a V.34 transmitter 52 and a D/A converter 54 that encode and modulate the digital data to be sent using techniques such as quadrature amplitude modulation (QAM). The hybrid 44 converts the unidirectional signal from the digital-to-analog converter 54 into a bidirectional signal that is transmitted to the central office 32. Once the signal is received at the central office 32, the central office hybrid 42 converts the bidirectional signal into a unidirectional signal that is provided to the central office codec. This unidirectional, analog signal is converted into either $\mu$-law or A-law companded PCM codewords by the codec compressor (A/D converter) 56, which are then transmitted through the PSTN 28 until reaching the server modem 26. The server modem 26 includes a conventional V.34 receiver 58 for demodulating and decoding the data sent by the V.34 transmitter 52 in the client modem 34. Thus, data is transferred from the client modem 34 to the server modem 26 at data rates of up to 33.6 kbps as provided for in the V.34 standard.

The V.90 standard offers increased data rates (e.g., data rates up to 56 kbps) in the downstream direction from a server to a subscriber or client. Upstream communication still takes place at conventional data rates as provided for in the V.34 standard. Nevertheless, this asymmetry may be particularly well suited for Internet access. For example, when accessing the Internet, high bandwidth is most useful when downloading large text, video, and audio files to a subscriber's computer. Using V.90, these data transfers can be made at up to 56 kbps. On the other hand, traffic flow from the subscriber to an ISP consists mainly of keystroke and mouse commands, which are readily handled by the conventional rates provided by V.34.

As described above, the digital portion of the PSTN 28 transmits information using eight-bit PCM codewords at a frequency of 8000 Hz. Thus, it would appear that downstream transmission should take place at 64 kbps rather than 56 kbps as defined by the V.90 standard. While 64 kbps is a theoretical maximum, several factors prevent actual transmission rates from reaching this ideal rate. First, even though the problem of quantization error has been substantially eliminated by using PCM encoding and PAM for transmission, additional noise in the network or at the subscriber premises, such as non-linear distortion and crosstalk, may limit the maximum data rate. Furthermore, the $\mu$-law or A-law companding techniques do not use uniform PAM voltage levels for defining the PCM codewords. The PCM codewords representing very low levels of sound have PAM voltage levels spaced close together. Noisy transmission facilities may prevent these PAM voltage levels from being distinguished from one another thereby causing loss of data. Accordingly, to provide greater separation between the PAM voltages used for transmission, not all of the 256 PCM codewords are used.

It is generally known that, assuming a convolutional coding scheme, such as trellis coding, is not used, the number of symbols required to transmit a certain data rate is given by Equation 1:

$$bps = R_s \log_2 N_s \qquad \text{EQ. 1}$$

where bps is the data rate in bits per second, $R_s$ is the symbol rate, and $N_s$ is the number of symbols in the signaling alphabet or constellation. To transmit at 56 kbps using a symbol rate of 8000, Equation 1 can be rewritten to solve for the number of symbols required as set forth below in Equation 2:

$$N_s = 2^{56000/8000} = 128 \qquad \text{EQ. 2}$$

Thus, the 128 most robust codewords of the 256 available PCM codewords are chosen for transmission as part of the V.90 standard.

The V.90 standard, therefore, provides a framework for transmitting data at rates up to 56 kbps provided the network is capable of supporting the higher rates. The most notable requirement is that there can be at most one digital-to-analog conversion and no analog-to-digital conversion in the downstream path in the network. Nevertheless, other digital impairments, such as robbed bit signaling (RBS) and digital mapping through PADs, which results in attenuated signals, may also inhibit transmission at V.90 rates. Communication channels exhibiting non-linear frequency response characteristics are yet another impediment to transmission at the V.90 rates. Moreover, these other factors may limit conventional V.90 performance to less than the 56 kbps theoretical data rate.

In view of the foregoing discussion, the selection of an optimal data rate from the server modem 26 to the client modem 34 may be a difficult problem for several reasons. First, the symbol error rate generally depends on both the noise power level and the many different and non-uniform spacings between the PAM voltage levels. Second, the spacings or distance between the PAM voltage levels may be affected by impairments in the digital network, such as digital attenuation PADs or RBS. Third, the PAM voltage levels that are available for transmission are typically not known in advance and may be estimated during start-up procedures for the client modem 34 using, for example, the V.90 digital impairment learning (DIL) signal.

Thus, it may be desirable to initiate a data rate renegotiation during a modem connection to achieve a better data rate or operating point. This may be instigated due to changes in subscriber line or receiver conditions or due to feedback from the error control protocol layer indicating the current error rate is too high. Other possible reasons for a mismatch between the target symbol error rate and the achieved symbol error rate at the client modem 34 may include deviations between the available PAM voltage levels and the PAM voltage levels measured during start-up, and non-linear effects that may result in distortion of high-amplitude PAM voltage levels.

A data rate renegotiation may also be useful for stabilizing the PAM receiver 48. For example, the PAM receiver 48 may include a decision feedback equalizer (DFE) for demodulating the incoming V.90 signal, which, because of the feedback configuration, may result in error events that last for many symbol intervals. As a result, even small bursts of errors may be catastrophic for the PAM receiver 48 if the equalizer coefficients become "detuned" and receiver timing synchronization is lost.

Consequently, there exists a need for improved error rate control mechanisms and related methods that may be used in establishing or negotiating a data rate.

SUMMARY OF THE INVENTION

It is an object of the present invention to improve the responsiveness of a communication device to errors, such as communication protocol errors.

This and other objects, advantages, and features of the present invention may be provided by error rate control systems, methods, and computer program products in which a data rate slow-down is requested based on the status of the error rate. A linear penalty is generated if a data rate slow-down is requested, which is then used to determine a minimum distance between constellation points in a signaling constellation or alphabet. Because the minimum distance between constellation points may be directly related to the error probability, the error rate may be controlled through the linear penalty.

In accordance with an aspect of the invention, the error rate may be monitored by monitoring the data-link level errors and/or the mean squared error (MSE).

In accordance with another aspect of the invention, the data-link level errors may be monitored by filtering the data-link level errors and a data rate slow-down may be requested if the filtered errors exceed a threshold. The MSE may be monitored by comparing the MSE with a threshold and a data rate slow-down may be requested if the MSE exceeds the threshold.

In accordance with still another aspect of the invention, the linear penalty is generated by defining penalty parameter (LCGPENALTY) that is incremented by a penalty step (LCGPENALTYSTEP) when a data rate slow-down is requested. The penalty parameter may then be used to generate the linear penalty. Optionally, the penalty parameter and an offset may be added together and this summation may be used to generate the linear penalty. The offset may be set to a positive value to force a more conservative data rate, a negative value to force a more aggressive data rate, or may be set to zero. The linear penalty may be generated as discussed in the foregoing if a new minimum distance is to be generated without regard to a minimum distance currently in use.

In accordance with yet another aspect of the invention, the penalty step, which is preferably set to 0.5 dB, is used to generate the linear penalty. The penalty step may be used to generate the linear penalty if a new minimum distance is to be generated by scaling a minimum distance currently in use.

In accordance with still another aspect of the invention, the minimum distance may be determined by setting the minimum distance to a lower bound and then multiplying the minimum distance by the linear penalty, which is preferably generated based on the penalty parameter. Alternatively, the minimum distance may be determined by setting the minimum distance to a current minimum distance between constellation points and multiplying the minimum distance by the linear penalty, which is preferably generated based on the penalty step.

Advantageously, error control systems, methods, and computer products in accordance with the present invention may provide for a small variability in the achieved symbol error rate across a multitude of existing line conditions. A smaller variability of the achieved symbol error rate may allow a more aggressive data rate or operating point to be selected, which may result in a higher throughput.

In accordance with another embodiment of the present invention, learned constellation points or levels are preserved in response to the detection of a severe error event. It may be unnecessary to rebuild the signaling constellation in response to a severe event; therefore, by preserving the learned constellation points, the refinements attained during a previous data mode may likewise be preserved.

A communication connection may experience a long-term degradation in signal quality due to time-varying analog components in the echo paths. Accordingly, in accordance with still another embodiment of the present invention, the MSE may be monitored and compared with a retrain threshold. If the MSE exceeds the retrain threshold, then an echo canceller in the communication device may be retrained.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENTS

Figure 1:
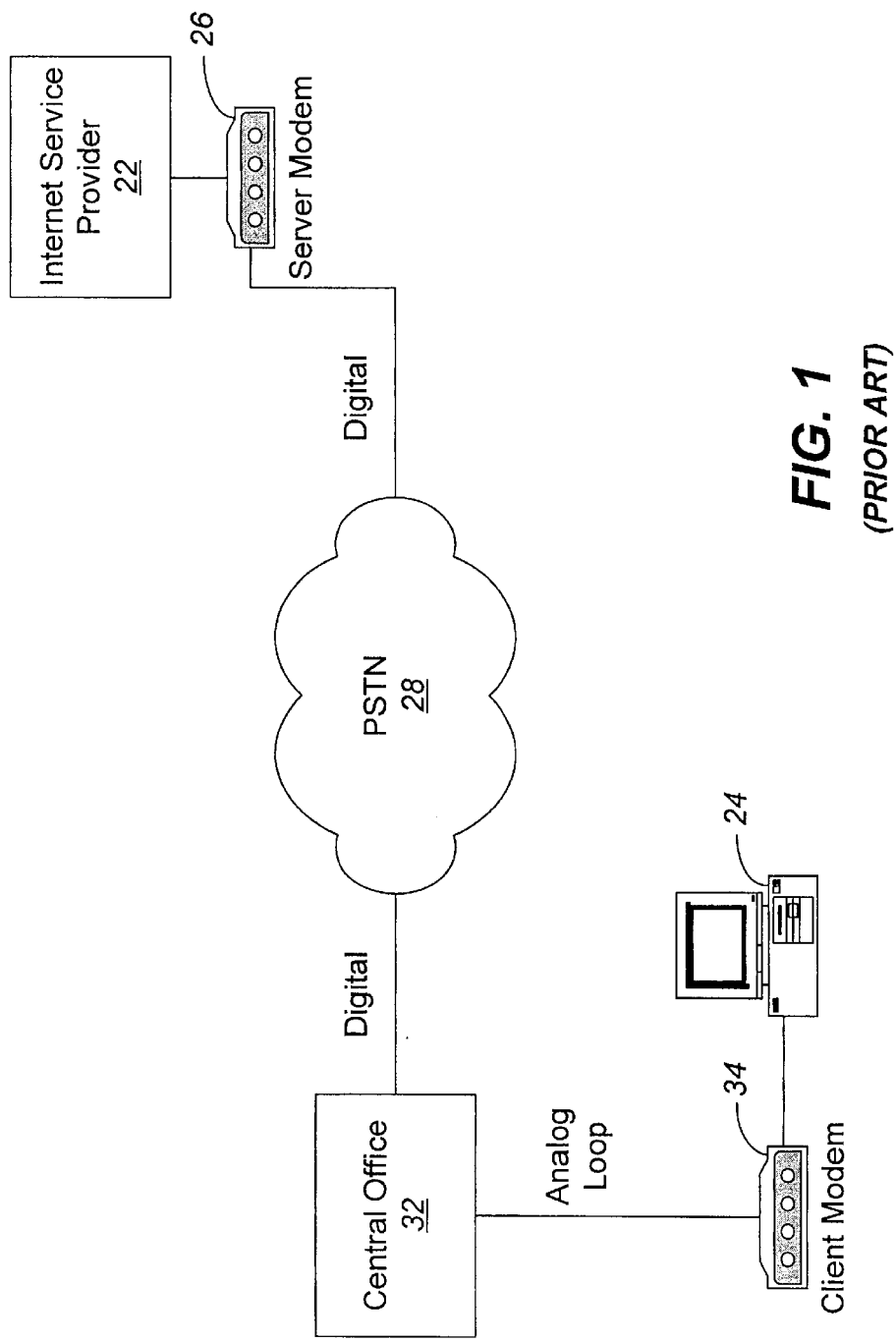
FIG. 1 is block diagram that illustrates a typical V.90 connection between a subscriber and an ISP in accordance with the prior art.
Figure 2:
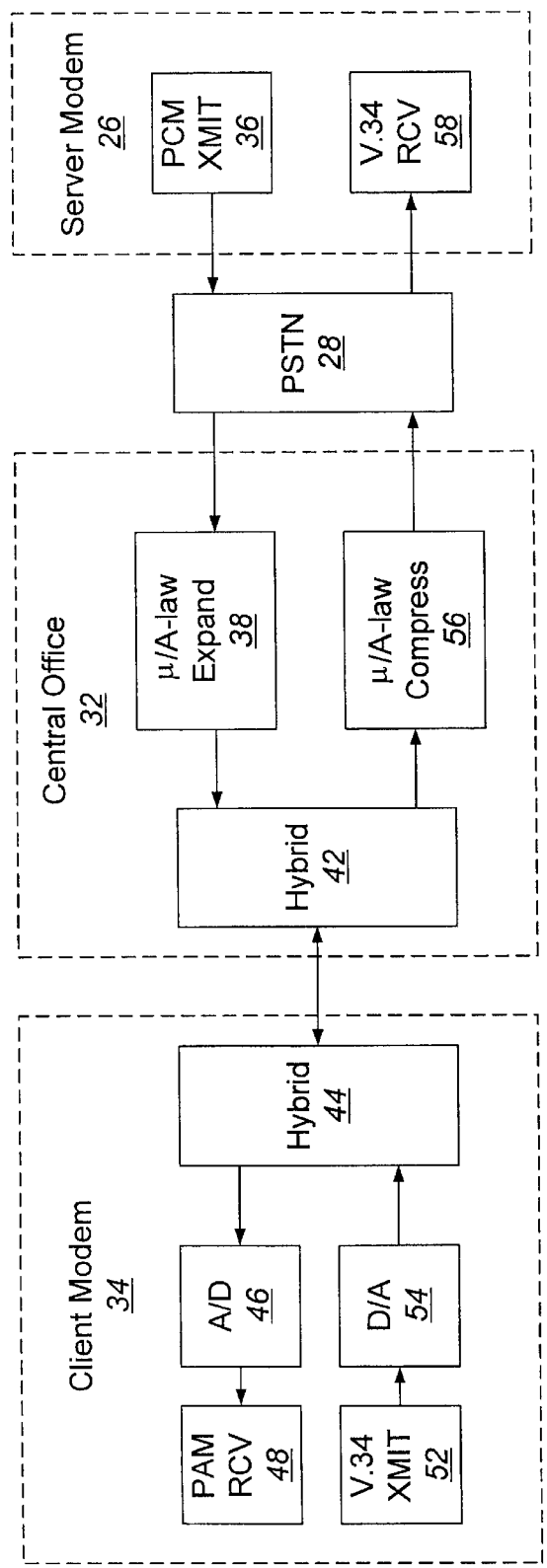
FIG. 2 is a block diagram that illustrates an internal architecture of a client modem, a central office, and a server modem shown in FIG. 1 and connections therebetween.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

The present invention may be embodied as a system, a method, or a computer program product for controlling the error rate in a communication device. Accordingly, the present invention may take the form of an entirely hardware embodiment, an entirely software (including firmware, resident software, micro-code, etc.) embodiment, or an embodiment containing both software and hardware aspects. Furthermore, the present invention may take the form of a computer program product on a computer-usable or computer-readable storage medium having computer-usable program code means embodied in the medium for use by or in connection with an instruction execution system. In the context of this document, a computer-usable or computer-readable medium may be any means that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in a high level programming language such as C or C++. Some modules or routines, however, may be written in assembly language, machine language, or micro-code to optimize speed, memory usage, or layout of the software or firmware in memory. In a preferred embodiment, the present invention uses microcode to implement most software programs.

For purposes of illustration and in no way limited thereto, exemplary error rate control systems, methods, and computer program products are discussed herein in the context of a modem application. It should be understood, however, that the error rate control systems, methods, and computer program products may be used in a vast array of communication devices that track communication errors and have a capability of making data rate adjustments in response thereto.

Error Rate Control System Architecture

Figure 3:
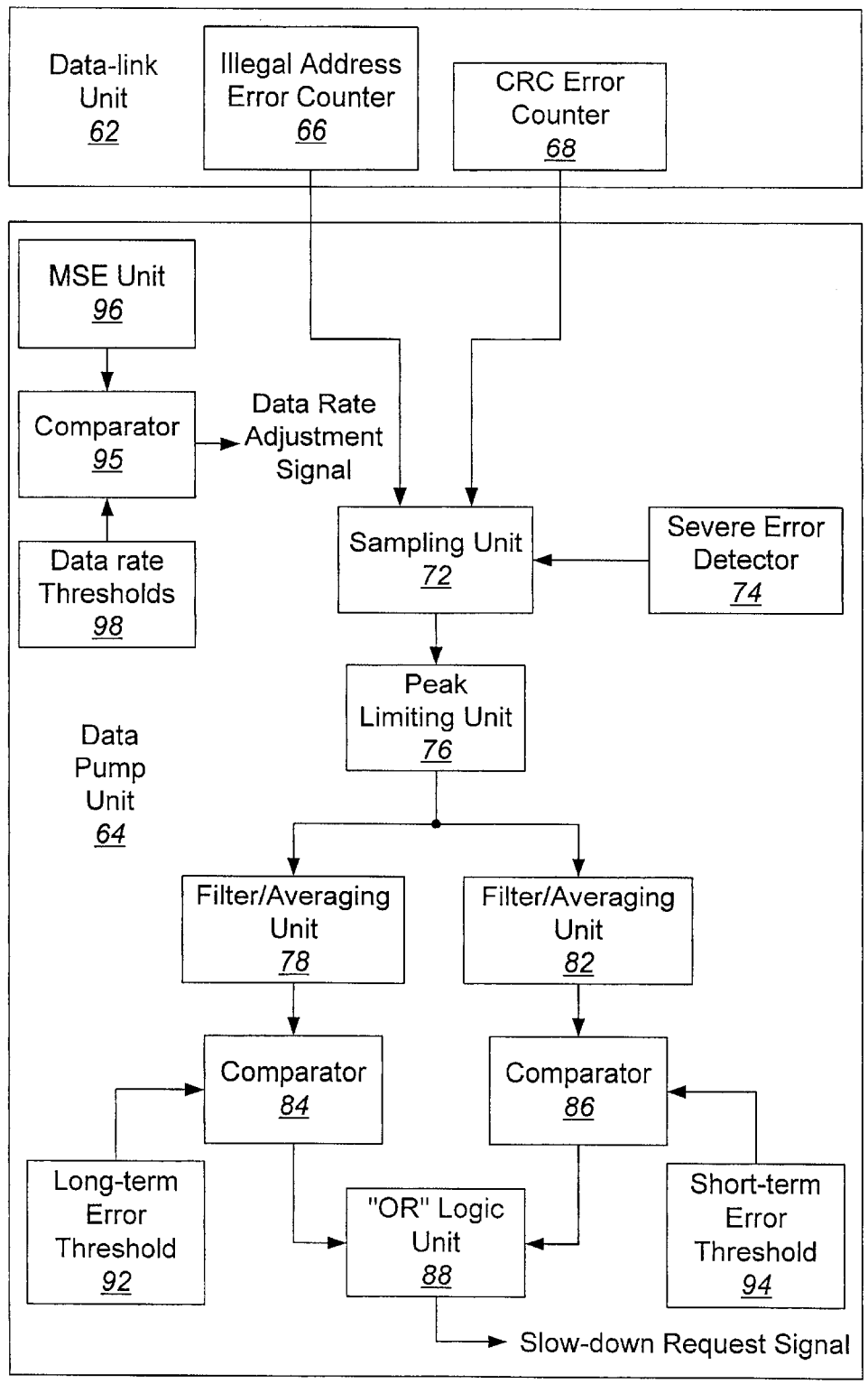
FIG. 3 is a block diagram of an exemplary error rate control system that illustrates error rate control systems, methods, and computer program products in accordance with the present invention.

With reference now to FIG. 3, a preferred architecture of an error rate control system for a communication device, such as a V.90 analog or client modem, will be described hereafter. An error rate control system, in accordance with the present invention, includes a data-link unit 62 and a data pump unit 64. The data-link unit 62 represents an implementation of a data-link protocol, such as the ITU V.42 Recommendation directed to error control procedures on analog transmission facilities. The data pump unit 64 implements both aspects of the present invention and customary modem functionality, such as, for example, but not limited to, filtering, modulation, equalization, echo cancellation, encoding, framing, etc.

The data-link unit 62 is generally used to guarantee the integrity of received data via detection of errors and to coordinate the retransmission of lost or bad data with a corresponding data-link unit associated with a modem at the other end of the connection. In accordance with the present invention, the data-link unit 62 maintains at least one error counter for tracking the number of errors detected at the data-link protocol level. As shown in FIG. 3, two error counters—an illegal address error counter 66 and a cyclic redundancy check (CRC) error counter 68—are maintained in a preferred embodiment of the error rate control system. The data-link unit 62 increments the illegal address counter 66 each time a packet (or other comparable construct in which data are packaged for transmission) is received with an invalid address. Likewise, the data-link unit 62 increments the CRC error counter each time a packet is received that contains a CRC checksum that does not match the computed CRC for the data in the packet. It is envisioned that additional or alternative counters may be defined and maintained for other types of data-link protocol errors, or even errors that are detected at higher levels in the communication protocol (e.g., network layer, transport layer, session layer, etc.) or at a lower level in the communication protocol (i.e., physical layer). Preferably, however, illegal address errors, which are tracked using the illegal address error counter 66, are given precedence over other possible illegal frame or packet conditions that may be detected when noise corrupts an idle pattern. Line errors during transmission of an idle pattern may often appear to the receiver as packets with an illegal address.

The data pump unit 64 includes a sampling unit 72 that periodically reads the illegal address error counter 66 and the CRC error counter 68 to obtain the current error counts from each counter. The sampling unit 72 determines a change or increase in the error counters 66 and 68 from a preceding read operation and then sums these changes together to compute a sampling interval error count. In a preferred embodiment, the sampling unit 72 reads the illegal address error counter 66 and the CRC error counter 68 every half-second.

A severe error detector 74 may be used to detect instability in a modem's receiver. For example, the severe error detector 74 may be configured to detect instances in which a signal sample output from the modem's equalizer falls outside a predefined boundary or boundaries, which contain valid points in the signal constellation used for transmitting symbols to the modem receiver. If the error signal derived from such an outlying equalizer signal sample is used to update the equalizer filter coefficients, then the coefficients may be adjusted away from their desired steady state values, which may result in a period of instability until the coefficients return to their previous values before the severe error event(s) occurred. Accordingly, if the severe error detector 74 detects instability, then the sampling interval error count is set to zero to effectively mask the severe error event(s) as at least a portion of the errors detected at the data-link protocol level are presumed to be connected with the source of the modem's instability. Exemplary embodiments of the severe error detector 74 are disclosed in U.S. application Ser. No. 09/264,094, now U.S. Pat. No. 6,341,360, entitled DECISION FEEDBACK EQUALIZERS, METHODS, AND COMPUTER PROGRAM PRODUCTS FOR DETECTING SEVERE ERROR EVENTS AND PRESERVING EQUALIZER FILTER CHARACTERISTICS IN RESPONSE THERETO, filed Mar. 8, 1999 and U.S. application Ser. No. 09/430,693, entitled SEVERE ERROR DETECTORS, METHODS, AND COMPUTER PROGRAM PRODUCTS THAT USE CONSTELLATION SPECIFIC ERROR EVENT THRESHOLDS TO DETECT SEVERE ERROR EVENTS DURING DEMODULATION OF A SIGNAL COMPRISING SYMBOLS FROM A PLURALITY OF SYMBOL CONSTELLATIONS, filed Oct. 29, 1999, the disclosures of which are hereby incorporated herein by reference.

The data pump unit 64 optionally includes a peak limiting unit 76 that prevents the sampling interval error count from exceeding a maximum error threshold. In a preferred embodiment of the error rate control system used in a V.90 analog/client modem, the maximum error threshold is set to four. In practice, the maximum error threshold may be set based on, for example, the data rate and/or the sampling interval duration or could even be set dynamically.

The sampling interval error count after being limited by the peak limiting unit 76 is then provided as input to a pair of filter/averaging units 78 and 82 arranged in parallel. The filter/averaging units 78 and 82 maintain a running average of the sampling interval error count and are preferably configured such that the filter/averaging unit 78 is characterized by a slow time-constant and the filter/averaging unit 82 is characterized by a fast time-constant. Accordingly, the filter/averaging unit 78 generates a slow-filtered sampling interval error count and the filter/averaging unit 82 generates a fast-filtered sampling interval error count at respective output terminals thereof.

The data pump unit 64 further includes a control logic unit, which comprises a pair of comparators 84 and 86 arranged in parallel and coupled to the filter/averaging units 78 and 82, respectively, and an "OR" logic unit 88. The outputs of the comparators 84 and 86 are provided as inputs to the "OR" logic unit 88, which generates a data rate slow-down request signal in accordance with the present invention. More specifically, the comparator 84 receives both the slow-filtered sampling interval error count from the filter/averaging unit 78 and a long-term error threshold 92 as inputs and generates a long-term error comparison signal at its output that indicates whether the slow-filtered sampling interval error count exceeds the long-term error threshold 92. Similarly, the comparator 86 receives both the fast-filtered sampling interval error count from the filter/averaging unit 82 and a short-term error threshold 94 as inputs and generates a short-term error comparison signal at its output that indicates whether the fast-filtered sampling interval error count exceeds the short-term error threshold 94. If either the long-term error comparison signal or the short-term error comparison signal indicate that their corresponding error threshold (i.e., long-term error threshold 92 and short-term error threshold 94, respectively) has been exceeded, then the "OR" logic unit 88 generates the data rate slow-down request signal, which may be used to initiate a data rate renegotiation.

While it is preferred that a data rate renegotiation be based on the filtered, data-link level error rate as discussed hereinabove, the data pump unit 64 may further include a comparator 95 that is responsive to a mean squared error (MSE) unit 96 and one or more data rate thresholds 98. If the data-link protocol layer is unavailable, a severe error has been detected by the severe error detector 74, or the connection is at an initial stage, then the MSE may be used as a basis for adjusting the data rate. The MSE unit 96 generates the MSE or error signal, which is defined as the difference between a signal output from an equalizer unit (not shown) and the detected signal as determined by a slicer/detector (not shown). The MSE or error signal is used to adapt the coefficients of the equalizer to the characteristics of the communication channel. The comparator 95 compares the error signal from the MSE unit with one of the data rate thresholds 98 defined as a slow-down threshold. If the MSE or error signal exceeds the slow-down threshold, then the comparator 95 generates a data rate adjustment signal corresponding to a slow-down request. Similarly, the data rate thresholds 98 may include a speed-up threshold such that if the error signal falls below the speed-up threshold, then the comparator 95 generates a data rate adjustment signal corresponding to a speed-up request.

Error Rate Control System Software Architecture

Figure 4:
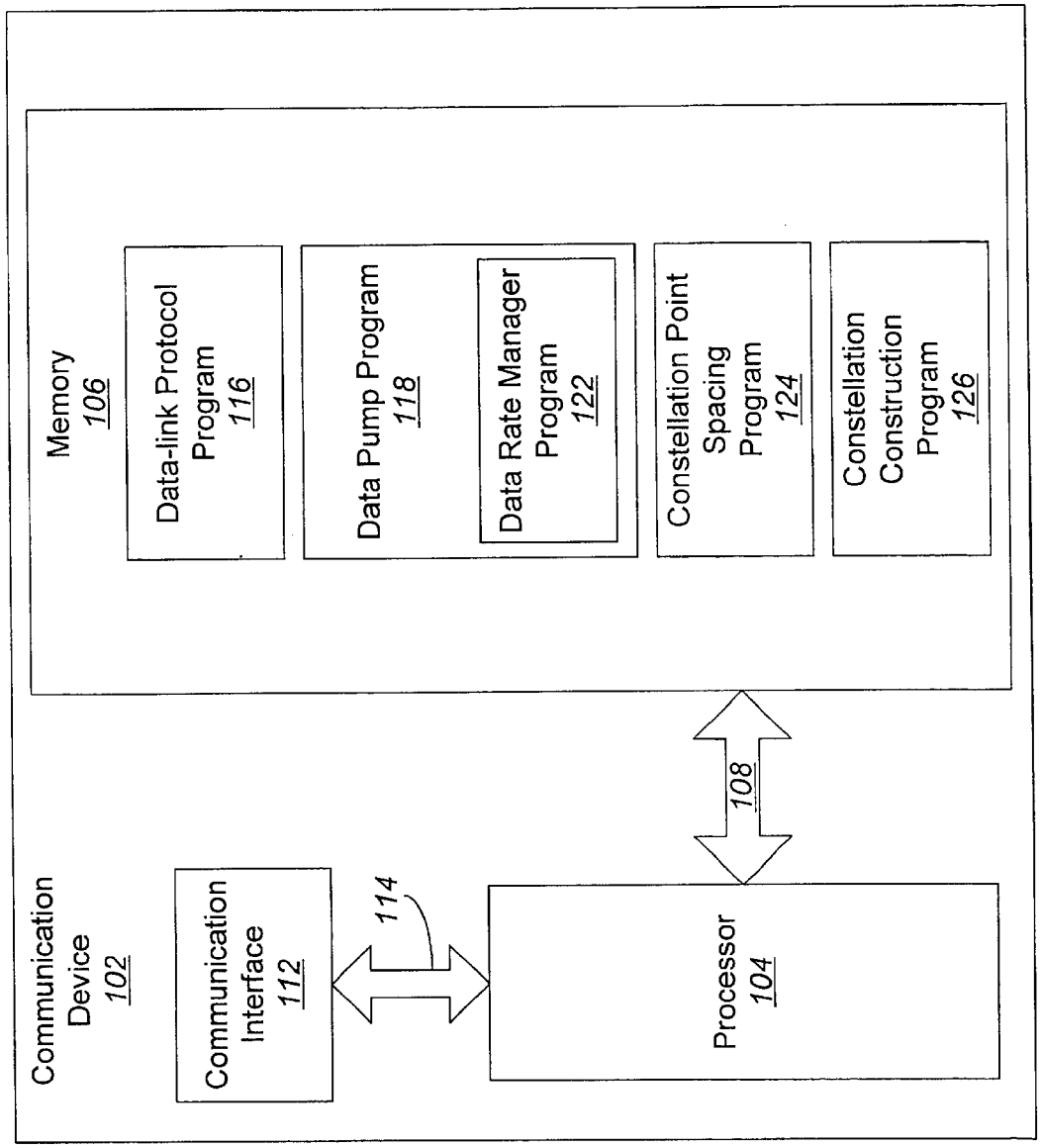
FIG. 4 is a block diagram that illustrates a software architecture for a communication device, such as a V.90 modem, and that includes an error rate control system shown in FIG. 3.

Referring now to FIG. 4, a software architecture for the data-link unit 62 and data pump unit 64 of a communication device 102, such as a V.90 modem, will be described. The communication device 102 includes a processor 104, preferably a digital signal processor, which communicates with a memory 106 via an address/data bus 108. In addition, the processor 104 may receive and transmit information to external devices via a communication interface 112, which is accessed through an input/output (I/O) bus 114. The processor 104 may be any commercially available or custom processor suitable for a real-time intensive embedded application. The memory 106 is representative of the overall hierarchy of memory devices containing the software and data used to implement the functionality of the communication device 102. The memory 106 may include, but is not limited to, the following types of devices: cache, ROM, PROM, EPROM, EEPROM, flash, SRAM, and DRAM.

As shown in FIG. 4, the memory 106 includes program modules for implementing the functionality of the components discussed in the foregoing with reference to FIG. 3. That is, the memory 106 includes a data-link protocol program module 116 and a data pump program module 118. Each of these program modules corresponds to a respective component of the error rate control system shown in FIG. 3. In addition, the data pump program module 116 further comprises a data rate manager program module 122, which controls the data rate to be used during a connection with another communication device (e.g., a remote modem) and may also use the slow-down request signal from the "OR" logic unit 88 and/or the data rate adjustment signal from the comparator 95 of FIG. 3 to determine when to negotiate a data rate reduction or speed-up. A constellation point spacing program 124 is preferably included that is responsive to the slow-down request signal and/or the data rate adjustment signal and generates a minimum distance or minimum spacing parameter, which refers to the spacing between the PAM signaling levels. The minimum distance parameter may be provided to a constellation construction program 126, which designs the signaling constellation or signaling alphabet comprising the PAM signaling levels used for transmitting information from a server modem to the analog/client modem.

The present invention is described herein with reference to flowchart and/or block diagram illustrations of methods, apparatus (systems), and computer program products according to an embodiment of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Operations and features provided by the data-link unit 62, the data-link protocol program module 116, the data pump unit 64, the data pump program module 118, the data rate manager program module 122, and the constellation point spacing program 124 of FIGS. 3 and 4 will be described hereafter with reference to the flow charts of FIGS. 5–8 and the architectural diagram of FIG. 3.

Communication Device Error Rate Control

Figure 5A:
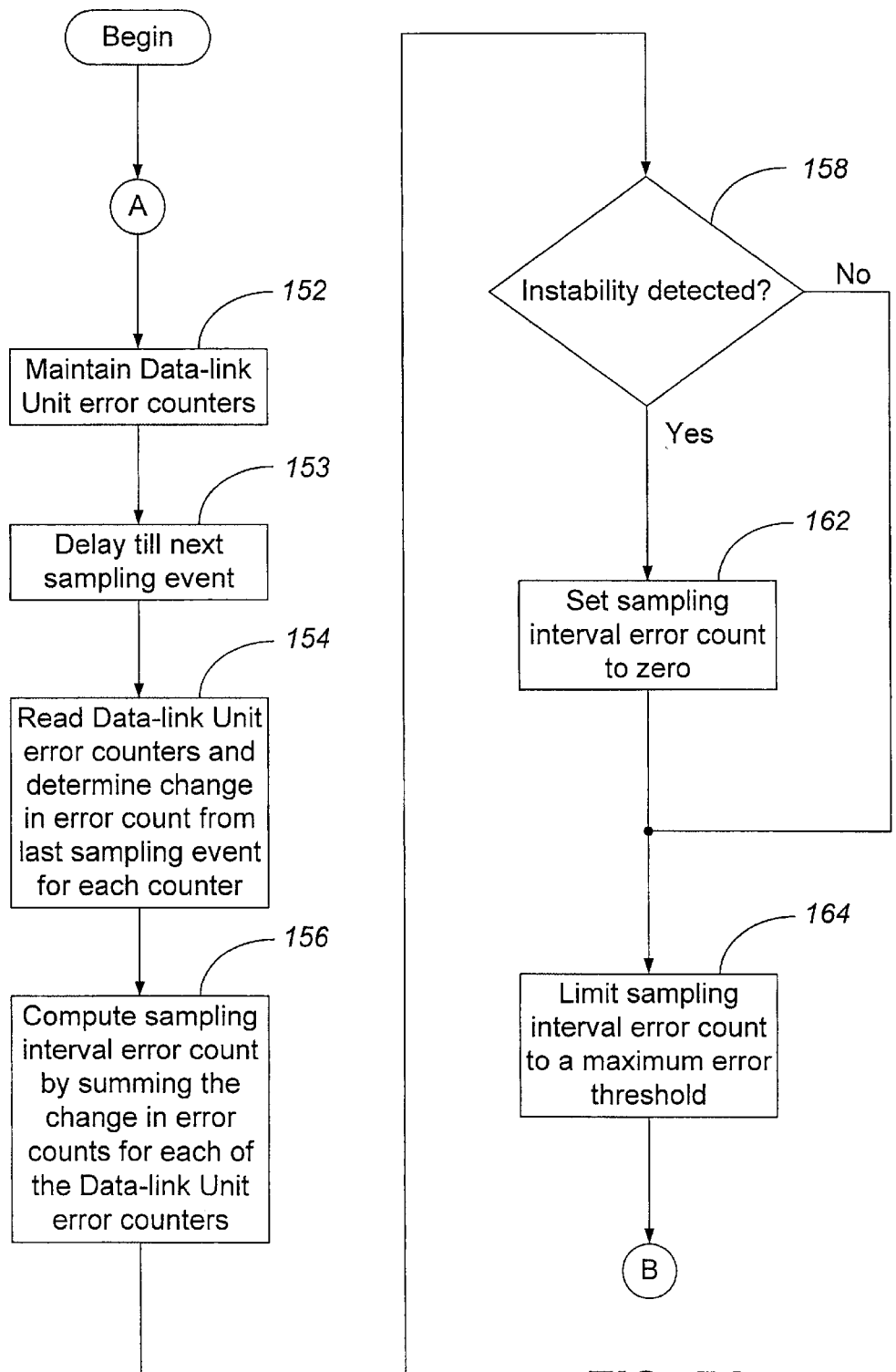
FIGS. 5–8 are flow charts that illustrate operations of error rate control systems, methods, and computer program products of FIGS. 3–4 in accordance with the present invention.

Referring now to FIGS. 3 and 5A, the illegal address error counter 66 and the CRC error counter 68 maintain counts at block 152 of illegal address errors and CRC errors, respectively, detected at the data-link protocol level. The sampling unit 72 waits at block 153 for the next sampling event, which preferably occurs every one-half second. At block 154, the sampling unit 72 reads each of the data-link unit error counters, which comprise the illegal address counter 66 and the CRC error counter 68 in a preferred embodiment of the error rate control system, to obtain the current error counts from each counter. Next, the sampling unit 72 determines a change or increase in the error counters 66 and 68 from a preceding read operation, and then sums these changes together to compute a sampling interval error count at block 156.

If the severe error detector 74 detects instability in the communication device (e.g., in a modem's equalizer) at block 158, then the sampling interval error count is set to zero at block 162 as at least a portion of the errors detected at the data-link protocol level are presumed to be connected with the source of the modem's instability. Otherwise, if instability in the communication device is not detected at block 158, then the sampling interval error count is unaffected by the severe error detector 74.

In addition to adjusting the sampling interval error count in view of instability in the communication device, the sampling interval error count may optionally be limited to a maximum value by the peak limiting unit 76 at block 164. More specifically, the peak limiting unit 76 clips the sampling interval error count at a maximum error threshold (i.e., sets the sampling interval error count to the maximum error threshold if the sampling interval error count exceeds the maximum error threshold), which is set to four in a preferred embodiment of the error rate control system used in a V.90 analog/client modem. A motivating factor for limiting the sampling interval error count to a maximum value is to prevent a single noise burst from causing a data rate slowdown. This may be particularly useful when illegal address errors are included in the error count as many of these errors may occur during the time it takes to transmit a single packet in a V.90 communication session.

Figure 5B:
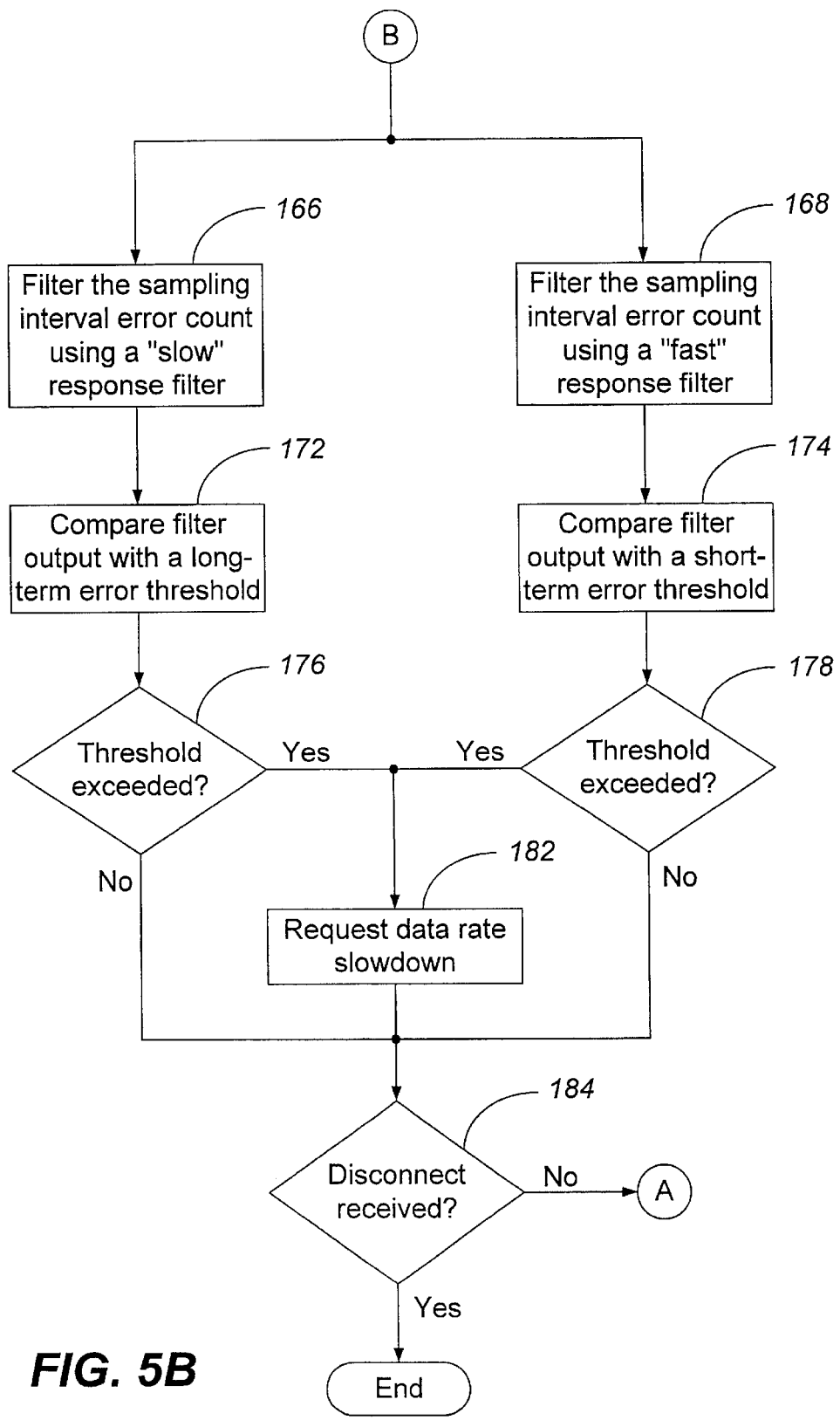

Operations continue by following connector B to FIG. 5B where the sampling interval error count, after any adjustment due to instability in the communication device by the severe error detector 74 or clipping by the peak limiting unit 76 has been applied, is provided in parallel to the filter/averaging units 78 and 82 at blocks 166 and 168, respectively. In a preferred embodiment of the error rate control system, the filter/averaging unit 78 filters the sampling interval error count at block 166 by multiplying a previous output by a first weight factor (WF1) to compute a first component and multiplying the sampling interval error count at the input of the filter/averaging unit 78 by a second weight factor (WF2) to compute a second component. The first and second components are added together to generate a slow-filtered sampling interval error count at the output of the filter/averaging unit 78. The weight factors are preferably fractional values whose sum equals one. Moreover, the first and second weight factors (WF1 and WF2) are preferably set so that the filter/averaging unit 78 is characterized by a slow time-constant (i.e., the output of the filter/averaging unit 78 responds relatively slowly to changes at the input of the filter/averaging unit 78). In a preferred embodiment of the error rate control system, WF1 is set to $15/16$ and WF2 is set to $1/16$.

Similarly, the filter/averaging unit 82 filters the sampling interval error count at block 168 by multiplying a previous output by a first weight factor (WF1) to compute a first component and multiplying the sampling interval error count at the input of the filter/averaging unit 82 by a second weight factor (WF2) to compute a second component. The first and second components are added together to generate a fast-filtered sampling interval error count at the output of the filter/averaging unit 82. The weight factors are preferably fractional values whose sum equals one. Moreover, the first and second weight factors (WF1 and WF2) are preferably set so that the filter/averaging unit 82 is characterized by a fast time-constant (i.e., the output of the filter/averaging unit 82 responds relatively quickly to changes at the input of the filter/averaging unit 82). In a preferred embodiment of the error rate control system, WF1 is set to $2/5$ and WF2 is set to $3/5$.

Alternative filter structures may be used without departing from the principles of the present invention. Nevertheless, the filter/averaging units 78 and 82 are preferably implemented using weight factors or filter coefficients that provide one of the filters with a fast time-constant and the other filter with a slow time-constant relative to each other.

The slow-filtered sampling interval error count from the output of the filter/averaging unit 78 is provided as an input to the comparator 84, which compares the slow-filtered sampling interval error count with a long-term error threshold 92 at block 172. In particular, the comparator 84 generates a long-term error comparison signal at its output that indicates whether the slow-filtered sampling interval error count exceeds the long-term error threshold 92. Likewise, the fast-filtered sampling interval error count from the output of the filter/averaging unit 82 is provided as an input to the comparator 86, which compares the fast-filtered sampling interval error count with a short-term error threshold 94 at block 174. The comparator 86 generates a short-term error comparison signal at its output that indicates whether the fast-filtered sampling interval error count exceeds the short-term error threshold 94.

If either the long-term error comparison signal or the short-term error comparison signal indicate that their corresponding error threshold (i.e., long-term error threshold 92 and short-term error threshold 94) has been exceeded as determined at blocks 176 and 178, respectively, then the "OR" logic unit 88 generates the slowdown request signal at its output at block 182 to request a data rate slowdown. The slowdown request signal may be provided to the data rate manager program module 122 (see FIG. 4), which may then negotiate a data rate reduction with a remote communication device.

If, however, neither of the error thresholds 92 and 94 have been exceeded as determined at blocks 176 and 178, respectively, then no data rate slowdown is requested. Finally, as represented by block 184, operations of the error rate control system continue until the connection is terminated.

In a preferred embodiment of the error rate control system used in a V.90 analog/client modem, the long-term error threshold 92 is selected such that a sustained error rate in excess of one-half error per second will trigger the "OR" logic unit 88 to generate the data rate slowdown request signal. In addition, the short-term error threshold 94 is preferably selected such that a short-term error rate in excess of two errors per second will trigger the "OR" logic unit 88 to generate the data rate slowdown request signal. Lastly, the sampling unit 72 preferably reads the illegal address error counter 66 and CRC error counter 68 every one-half second. It should be understood, however, that the particular values used for the long-term and shortterm error thresholds 92 and 94, the error sampling frequency, and the maximum error threshold used by the peak limiting unit 76 may be unique to a particular application. Accordingly, these values may be adjusted to suit both the environment in which the error rate control system is used and user preferences with regard to the sensitivity of the error rate control system to errors.

Thus, unlike traditional data rate or error control systems that use a single error threshold, which may prohibit the system from discriminating between isolated bursts of many errors spanning a short time duration and fewer errors that continue to occur over an extended time frame, error rate control systems, in accordance with the present invention, use two independent filters to process errors—one filter with a fast time-constant that may respond to large error bursts spanning a short time period and a second filter with a slow time-constant that may respond to lower numbers of errors, which are sustained over an extended time period.

Minimum Distance Adjustment for the Signaling Constellation

Successful operation of a V.90 analog/client modem may depend on an accurate identification of the reference PAM signaling levels that are often called the signaling alphabet or the signal constellation. The digital samples that have been filtered by the data pump unit 64 equalizer (not shown) are provided to the slicer/detector (not shown) where the samples are compared against the signaling alphabet (i.e., indexed reference signal levels). A determination is made with regard to which member of the alphabet or which point in the constellation the digital sample falls closest to. Once the alphabet member is identified, the PCM codeword corresponding to that alphabet member is selected as the symbol transmitted for that digital sample. If the PAM signaling levels used in the signaling constellation or alphabet are spaced close together, then it may be difficult for the modem receiver to accurately detect the transmitted symbol in the presence of noise. By increasing the minimum distance between the PAM signaling levels, the error rate may be improved in exchange for a reduction in data rate.

Figure 6A:
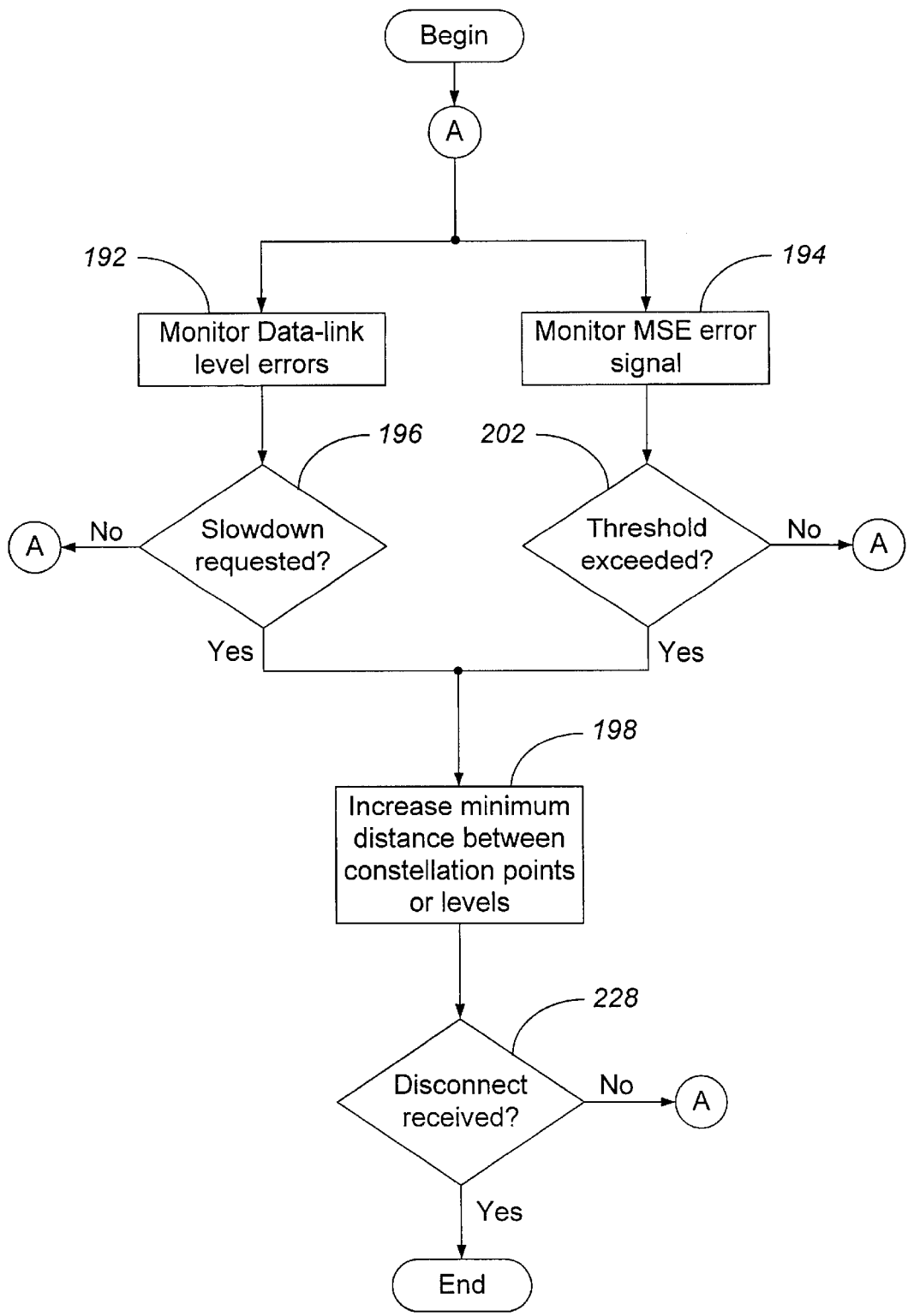

Referring now to FIGS. 3 and 6A, data-link level errors are monitored at block 192 as discussed hereinabove with respect to FIGS. 5A–5B. In addition, the MSE unit 96 may monitor the MSE or error signal at block 194 if the data-link protocol layer is unavailable, a severe error has been detected by the severe error detector 74, or the connection is at an initial stage. The MSE or error signal is based on the difference between a signal output from the equalizer unit (not shown) and the detected signal as determined by a slicer/detector (not shown). If the slow-down request signal is asserted by the "OR" logic unit 88 at block 196, then the minimum distance between constellation points or levels is increased at block 198. While data-link level errors are preferred as a basis for adjusting the minimum distance between constellation points or levels, the MSE or error signal from the MSE unit 96 may be used in the alternative. Thus, if the MSE or error signal from the MSE unit 96 exceeds a slow-down threshold, which comprises one of the data rate thresholds 98, at block 202, then the minimum distance between constellation points or levels is increased at block 198. These operations continue until the connection is terminated as represented by block 228.

Figure 6B:
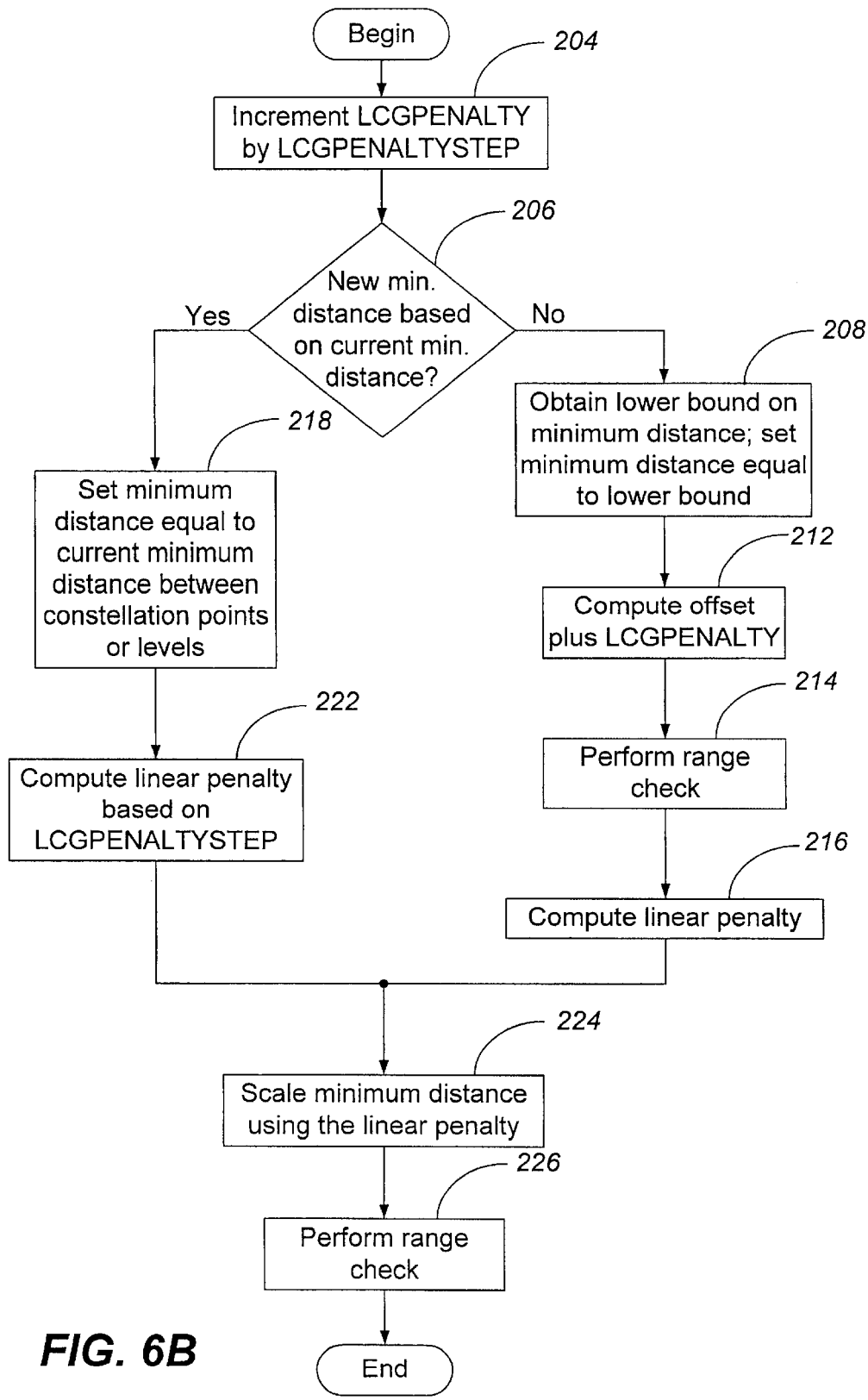

Referring now to FIG. 6B, operations of the constellation point spacing program 124 (see FIG. 4) in determining an increased minimum distance, for example, for use in block 198, will be described hereafter. In accordance with a preferred embodiment of the error rate control system, a parameter LCGPENALTY is defined and incremented by a penalty step (LCGPENALTYSTEP) at block 204 each time a data rate slow-down is attempted. The penalty is used by the constellation point spacing program 124 to ensure that a data rate slow-down will result in an improved error rate. In a preferred embodiment, the LCGPENALTYSTEP parameter is set to 0.5 dB.

Two options may be available for generating a new minimum distance between constellation points in response to a data rate slow-down attempt: A new minimum distance may be generated without regard to the minimum distance currently in use or the minimum distance currently in use may be increased using a scaling factor. Generally, a new minimum distance is generated without regard to the minimum distance currently in use if the data-link unit 62 is down or not available (i.e., layer-two error correction is not available) or if the data-link unit 62 is available, but the data rate renegotiation is due to a severe error event. A new minimum distance may also be generated without regard to the minimum distance currently in use if a data rate speed-up is being attempted, e.g., after a severe error event. Accordingly, the minimum distance currently in use may be increased by using a scaling factor if the data-link unit 62 is available and the rate renegotiation is due to a data rate slow-down request.

A determination is made at block 206 whether a new minimum distance will be generated based on the minimum distance currently in use, or whether a new minimum distance is to be generated without regard to the minimum distance currently in use. Generation of a new minimum distance without regard to the minimum distance currently in use will be discussed first. At block 208, a lower bound is obtained for the minimum distance, preferably using the MSE or error signal from the MSE unit 96, and the minimum distance is set to this lower bound. Determination of the lower bound is described in detail in U.S. patent application Ser. No. 09/430,693, entitled SYSTEMS, METHODS AND COMPUTER PROGRAM PRODUCTS FOR GENERATING AND OPTIMIZING SIGNAL CONSTELLATIONS, filed concurrently herewith, the disclosure of which is hereby incorporated herein by reference.

A variable logPenalty is generated by adding an offset and the LCGPENALTY parameter at block 212. The offset may be a positive value to force a more conservative data rate (i.e., a larger minimum distance), a negative value to force a more aggressive data rate (i.e., a smaller minimum distance), or may be set to zero. The variable logPenalty may be range checked at block 214 to ensure that it does not exceed a maximum allowed value (MAXLOGPENALTY). Blocks 212 and 214 may be represented by Equation 3 set forth below:

$$\text{logPenalty}=\min(\text{LCGPENALTY}+\text{offset}, \text{MAXLOGPENALTY}) \quad \text{EQ. 3}$$

That is, logPenalty is set to the minimum of the LCGPENALTY plus the offset and the maximum allowed value.

The variable logPenalty is then used to compute a linear penalty (linPenalty) at block 216 as set forth in Equation 4 below:

$$\text{linpenalty} = 2^{(C \cdot \text{logpenalty})} \qquad \text{EQ. 4}$$

where C is a scaling constant given by Equation 5 in a preferred embodiment of the present invention:

$$C = \log_2(10)/(2^8 * 20) \qquad \text{EQ. 5}$$

If a determination is made at block 206 that the minimum distance currently in use is to be used as a basis for generating the new minimum distance (i.e., layer-two is available and the rate renegotiation is due to a data rate slow-down request), then the minimum distance is set to the minimum distance currently in use at block 218. The linear penalty is then computed at block 222 using the LCGPEN-ALTYSTEP parameter as set forth in Equation 6 below:

$$\text{linPenalty} = 2^{(C \cdot \text{LCGPENALTYSTEP})} \qquad \text{EQ. 6}$$

Note that inasmuch as the new minimum distance is based on the current minimum distance, the LCGPENALTYSTEP is used to generate the linear penalty rather than using the LCGPENALTY parameter.

At block 224, the minimum distance is computed by multiplying the value assigned to the minimum distance at either block 208 or 218 by the linear penalty computed at either block 216 or 222. This operation may be represented by Equation 7 set forth below:

$$\min_{13} \text{distance} = \text{round}(\min_{13} \text{distance} * \text{linPenalty}) \qquad \text{EQ. 7}$$

Note that the minimum distance between constellation points may be rounded to the nearest integer.

Finally, at block 226, the minimum distance may be range checked to ensure that the minimum distance does not fall below a predefined minimum value (MINDISTMIN). This operation may be represented by Equation 8 set forth below:

$$\min_{13} \text{distance} = \max(\min_{13} \text{distance}, \text{MINDISTMIN}) \qquad \text{EQ. 8}$$

The minimum distance generated as discussed in the foregoing may then be provided to the constellation construction program module 126 (see FIG. 4), which may use the minimum distance to build a new signal constellation or signaling alphabet. Moreover, inasmuch as increasing the minimum distance may relate directly to a decrease in error probability, the resultant signal constellation may have an improved error rate. More specifically, if the new minimum distance is based on the minimum distance associated with a constellation currently in use, then the error rate will be reduced due to the increased spacing between the constellation points while the data rate may decrease or may even remain the same.

It should be understood that parameters such as LCGPENALTY, LCGPENALTYSTEP, and the offset that may be added to the LCGPENALTY parameter to compute the logPenalty variable may be entered or modified by a user through, for example, an attention (AT) command via the communication interface 112 (see FIG. 4).

Data Rate Adjustments in Response to Severe Error Events

Certain line conditions may cause severe error events during which the line errors continue to propagate through the feedback loop of a decision feedback equalizer (not shown) in the data pump unit 64 of FIG. 3. When such a condition is detected by, for example, the severe error detector 74, a rate renegotiation is typically requested. It is generally not necessary, however, to increase the minimum spacing between the constellation points or levels because the purpose of the data rate renegotiation is to terminate the continuing propagation of the line errors through the feedback loop and not to establish a new operating data rate. Propagation of the line errors may frequently be terminated through reception of the TRN2D signal as defined in the V.90 Recommendation, which is used during phase four of the modem start-up.

Figure 7:
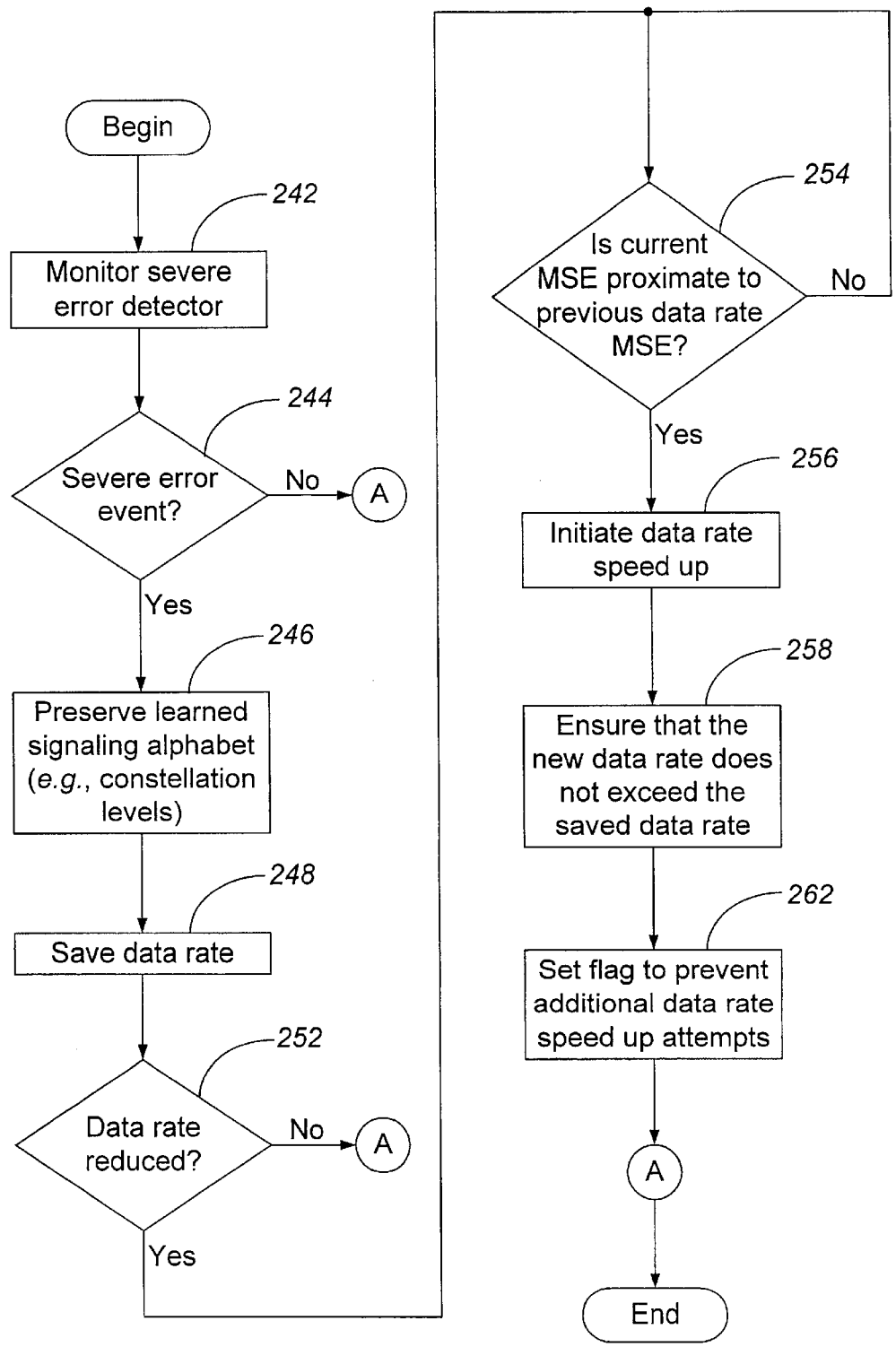

Accordingly, and with reference now to FIGS. 3 and 7, the MSE unit 96 monitors the MSE or error signal at block 242. If the severe error detector 74 detects a severe error event at block 244, then instead of increasing the minimum distance between constellation points or levels and building a new signal constellation, the constellation points or levels that have been learned at the receiver are preserved at block 246 and the data rate is saved at block 248. It should be understood that while the signaling constellation may comprise a set of ideal points or levels, the effective constellation will typically deviate from these ideal levels because of underlying digital impairments resulting from RBS and attenuation PADS. Understanding that these impairments will likely be chronic throughout the communication session, it may be more efficient for a modem receiver to make use of constellation refinements that take these impairments into account. It may, therefore, be desirable to avoid rebuilding the signaling constellation as the refinements attained during constellation learning would be lost.

Nevertheless, under extreme line conditions, a severe error event may have a residual effect on the MSE error signal such that the modem will slow down to a lower data rate for which a new signaling constellation will be rebuilt as represented by block 252. Under this condition, the modem may attempt to speed up once the MSE (i e., error signal from the MSE unit 96) improves. At block 254, the comparator 95 determines when the error signal from the MSE unit 96 is within an acceptable proximity, which is approximately 1 dB in a preferred embodiment of the present invention, to the MSE associated with the previous data rate saved at block 248. When the error signal from the MSE unit 96 is within an acceptable proximity to the previous MSE, the comparator 95 asserts the data rate adjustment signal to initiate a data rate speed up at block 256.

To avoid instability, an internal timer may be used to delay any speed up attempt until the connection has had time to stabilize. Furthermore, the data rate manager program module 122 (see FIG. 4) may use the pre-severe error event data rate saved at block 248 as an upper limit at block 258. This may allow unnecessary data rate changes to be avoided should the MSE set a false expectation of an achievable data rate. Finally, a flag is set at block 262 to prevent additional data rate speed up attempts. This may prevent thrashing due to extra data rate renegotiation cycles when the data rate speed up results in a data rate that is lower than the data rate at the time of the severe error event.

Slow Spiral of Death

A connection between an analog/client modem and a server modem may experience a long-term degradation in signal quality due to time-varying analog components in the echo paths. This degradation may sometimes be referred to as the "slow spiral of death" or SSOD. Several data rate slow-downs may be initiated due to data-link layer (level two) errors and/or a deteriorating MSE. Nevertheless, the signal quality may degrade to the point where it may be beneficial to initiate a retrain procedure. The retrain procedure may be more time consuming than a data rate renegotiation, but it typically allows the original MSE to be restored by retraining the filter coefficients of the echo canceller (not shown) in the data pump unit 64 (see FIG. 3).

Figure 8:
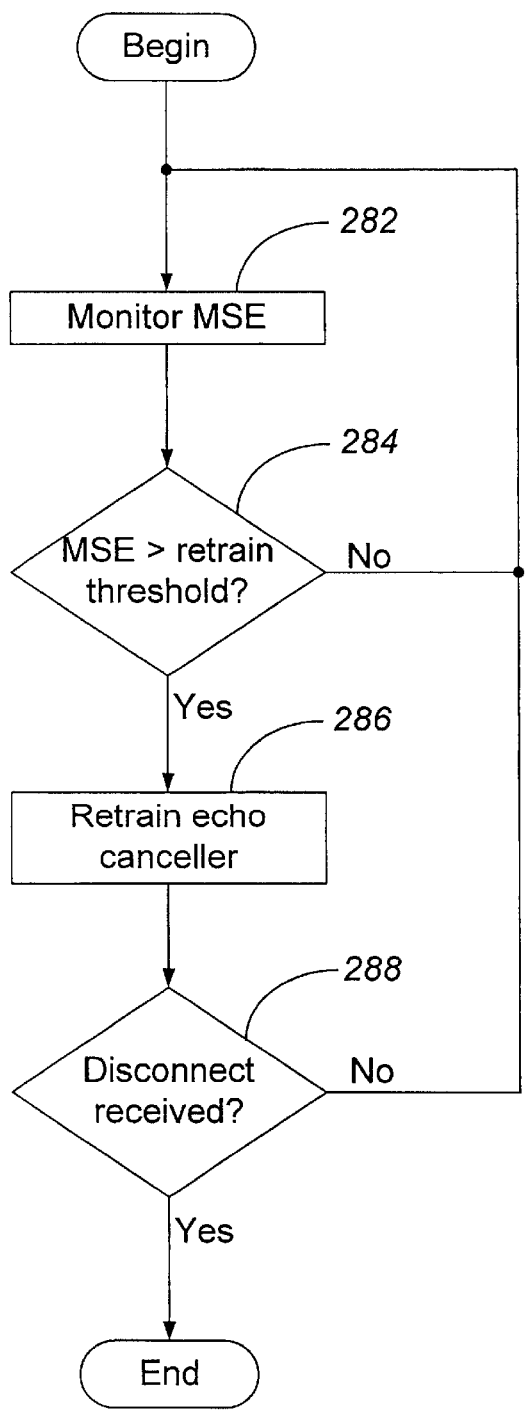

With reference to FIGS. 3 and 8, the MSE is monitored at block 282 by the MSE unit 96. The comparator 95 compares the error signal from the MSE unit 96 with a retrain threshold. In a preferred embodiment, the retrain threshold is set at 6 dB above the MSE obtained on entry into data mode at the beginning of the connection or after a previous retrain. If the current MSE exceeds the retrain threshold at block 284, then a retrain procedure for the echo canceller is initiated at block 286. These operations continue until the connection is terminated as represented by block 288. Advantageously, a series of data rate slow-downs until a minimum data rate is reached may be avoided.

The flow charts of FIGS. 5A–5B and 6–8 illustrate the architecture, functionality, and operations of a possible implementation of the communication device 102 software. In this regard, each block represents a module, segment, or portion of code, which comprises one or more executable instructions for implementing the specified logical function (s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

While the present invention has been illustrated and described in detail in the drawings and foregoing description, it is understood that the embodiments shown are merely exemplary. Moreover, it is understood that many variations and modifications can be made to the embodiments described hereinabove without substantially departing from the principles of the present invention. All such variations and modifications are intended to be included herein within the scope of the present invention, as set forth in the following claims.

We claim:

1. A system for controlling an error rate in a communication device, comprising:
   means for requesting a data rate slow-down based on the error rate;
   means for generating a linear penalty if the data rate slow-down is requested; and
   means for determining a minimum distance between constellation points based on the linear penalty if the data rate slow-down is requested, the means for determining the minimum distance comprising:
      means for setting the minimum distance to one of a lower bound and a current minimum distance between constellation points; and
      means for multiplying the minimum distance by the linear penalty.

2. A system as recited in claim 1, further comprising:
   means for monitoring data-link level errors to determine the error rate.

3. A system as recited in claim 2, wherein the means for monitoring comprises:
   means for filtering the data-link level errors; and
   means for comparing the filtered data-link level errors with a threshold; and wherein the means for requesting comprises:
      means for requesting the data rate slow-down if the filtered data-link level errors exceed the threshold.

4. A system as recited in claim 1, further comprising:
   means for monitoring the mean squared error (MSE) to determine the error rate.

5. A system as recited in claim 4, wherein the means for monitoring comprises:
   means for comparing the MSE with a threshold; and wherein the means for requesting comprises:
      means for requesting the data rate slow-down if the MSE exceeds the threshold.

6. A system as recited in claim 5, further comprising:
   means for computing a sum of a penalty parameter plus an offset; and wherein the means for generating the linear penalty comprises:
      means for generating the linear penalty based on the sum of the penalty parameter plus the offset.

7. A system as recited in claim 1, wherein the means for requesting comprises:
   means for requesting the data rate slow-down if the error rate exceeds a threshold; and wherein the means for generating comprises:
      means for incrementing a penalty parameter by a penalty step if the data rate slow-down is requested; and
      means for generating the linear penalty based on the penalty parameter.

8. A system as recited in claim 1, wherein the means for generating comprises:
   means for generating the linear penalty based on a penalty step parameter.

9. A system as recited in claim 8, wherein the penalty step parameter is about 0.5 dB.

10. A system as recited in claim 1, wherein the constellation points comprise pulse amplitude modulated (PAM) signaling levels.

11. A method of controlling an error rate in a communication device, comprising the steps of:
   requesting a data rate slow-down based on the error rate;
   generating a linear penalty if the data rate slow-down is requested; and
   determining a minimum distance between constellation points based on the linear penalty if the data rate slow-down is requested, wherein determining the minimum distance comprises:
      setting the minimum distance to one of a lower bound and a current minimum distance between constellation points; and
      multiplying the minimum distance by the linear penalty.

12. A method as recited in claim 11, further comprising the step of:
   monitoring data-link level errors to determine the error rate.

13. A method as recited in claim 12, wherein the steps of monitoring data-link level errors and requesting the data rate slow-down comprise the steps of:
   filtering the data-link level errors;
   comparing the filtered data-link level errors with a threshold; and
   requesting the data rate slow-down if the filtered data-link level errors exceed the threshold.

14. A method as recited in claim 11, further comprising the step of:
   monitoring a mean squared error (MSE) to determine the error rate.

15. A method as recited in claim 14, wherein the steps of monitoring the MSE and requesting the data rate slow-down comprise the steps of:

comparing the MSE with a threshold; and requesting the data rate slow-down if the MSE exceeds the threshold.

16. A method as recited in claim 15, further comprising the step of:

computing a sum of a penalty parameter plus an offset; and wherein the step of generating the linear penalty comprises the step of:

generating the linear penalty based on the sum of the penalty parameter plus the offset.

17. A method as recited in claim 11, wherein the step of requesting the data rate slow-down comprises the step of:

requesting the data rate slow-down if the error rate exceeds a threshold; and wherein the step of generating the linear penalty comprises the steps of:

incrementing a penalty parameter by a penalty step if the data rate slow-down is requested; and generating the linear penalty based on the penalty parameter.

18. A method as recited in claim 11, wherein the step of generating the linear penalty comprises the step of:

generating the linear penalty based on a penalty step parameter.

19. A method as recited in claim 18, wherein the penalty step parameter is about 0.5 dB.

20. A method as recited in claim 11, wherein the constellation points comprise pulse amplitude modulated (PAM) signaling levels.

21. A computer program product for controlling an error rate in a communication device, comprising:

a computer readable storage medium having computer readable program code embodied therein, the computer readable program code comprising:

computer readable program code for requesting a data rate slow-down based on the error rate;

computer readable program code for generating a linear penalty if the data rate slow-down is requested; and computer readable program code for determining a minimum distance between constellation points based on the linear penalty if the data rate slow-down is requested, the computer readable program code for determining the minimum distance comprising:

computer readable program code for setting the minimum distance to one of a lower bound and a current minimum distance between constellation points; and computer readable program code for multiplying the minimum distance by the linear penalty.

22. A computer program product as recited in claim 21, further comprising:

computer readable program code for monitoring data-link level errors to determine the error rate.

23. A computer program product as recited in claim 22, wherein the computer readable program code for monitoring comprises:

computer readable program code for filtering the data-link level errors;

computer readable program code for comparing the filtered data-link level errors with a threshold; and wherein the computer readable program code for requesting comprises:

computer readable program code for requesting the data rate slow-down if the filtered data-link level errors exceed the threshold.

24. A computer program product as recited in claim 21, further comprising:

computer readable program code for monitoring the mean squared error (MSE) to determine the error rate.

25. A computer program product as recited in claim 24, wherein the computer readable program code for monitoring comprises:

computer readable program code for comparing the MSE with a threshold; and wherein the computer readable program code for requesting comprises:

computer readable program code for requesting the data rate slow-down if the MSE exceeds the threshold.

26. A computer program product as recited in claim 25, further comprising:

computer readable program code for computing a sum of a penalty parameter plus an offset; and wherein the computer readable program code for generating the linear penalty comprises:

computer readable program code for generating the linear penalty based on the sum of the penalty parameter plus the offset.

27. A computer program product as recited in claim 21, wherein the computer readable program code for requesting comprises:

computer readable program code for requesting the data rate slow-down if the error rate exceeds a threshold; and wherein the computer readable program code for generating comprises:

computer readable program code for incrementing a penalty parameter by a penalty step if the data rate slow-down is requested; and computer readable program code for generating the linear penalty based on the penalty parameter.

28. A computer program product as recited in claim 21, wherein the computer readable program code for generating comprises:

computer readable program code for generating the linear penalty based on a penalty step parameter.

29. A computer program product as recited in claim 28, wherein the penalty step parameter is about 0.5 dB.

30. A computer program product as recited in claim 21, wherein the constellation points comprise pulse amplitude modulated (PAM) signaling levels.

* * * * *